US005584715A

United States Patent [19]
Ehrenfels

[11] Patent Number: 5,584,715
[45] Date of Patent: Dec. 17, 1996

[54] UNIVERSAL ELECTRICAL CONNECTOR FOR RECEIVING DC AND AC ELECTRICAL CONNECTORS

[75] Inventor: Alfred L. Ehrenfels, Cheshire, Conn.

[73] Assignee: Hubbell Incorporated, Orange, Conn.

[21] Appl. No.: 233,923

[22] Filed: Apr. 28, 1994

[51] Int. Cl.$^6$ ............................................. H01R 27/00
[52] U.S. Cl. ........................................... 439/222; 439/310
[58] Field of Search ...................... 439/310, 173, 439/638, 39, 137, 136, 218, 221, 220, 222; 320/2

[56] References Cited

U.S. PATENT DOCUMENTS

| | | | |
|---|---|---|---|
| 3,270,267 | 8/1966 | Nolte, Jr. | 439/923 |
| 3,950,059 | 4/1976 | Anhalt et al. | |
| 4,158,802 | 6/1979 | Rose, II | 320/2 |
| 4,188,084 | 2/1980 | Buresi et al. | |
| 4,203,640 | 5/1980 | Bice et al. | |
| 4,217,019 | 8/1980 | Cameron | |
| 4,232,260 | 11/1980 | Lambkin | 439/173 X |
| 4,431,241 | 2/1984 | Hazelhurst | |
| 4,624,472 | 11/1986 | Stuart et al. | 439/310 X |
| 4,718,862 | 1/1988 | Beeman | 439/482 |
| 4,843,477 | 6/1989 | Mizutani et al. | 358/248 |
| 5,157,319 | 10/1992 | Klontz et al. | 320/2 OR |
| 5,174,772 | 12/1992 | Vranish | 439/131 |
| 5,252,078 | 10/1993 | Langenbahn | 439/34 |
| 5,306,999 | 4/1994 | Hoffman | 320/2 |
| 5,344,330 | 9/1994 | Hoffman | 439/310 X |
| 5,350,312 | 9/1994 | Kuno et al. | 439/310 OR |

*Primary Examiner*—P. Austin Bradley
*Assistant Examiner*—Daniel Wittels
*Attorney, Agent, or Firm*—Jerry M. Presson; David L. Tarnoff

[57] ABSTRACT

A universal AC/DC electrical connector for selectively coupling either a mating direct electrical current (DC) electrical connector or a mating alternating electrical current (AC) electrical connector to selectively receive both direct electrical current (DC) and alternating electrical current (AC) therein. The AC/DC electrical connector has a pair of direct current contacts, a pair of alternating current contacts, and a ground contact. When DC electrical connector is coupled to the AC/DC electrical connector, the direct current contacts and the ground contact electrically engage corresponding electrical contacts of the DC electrical connector, while the alternating current contacts of the AC/DC electrical connector remains uncoupled, i.e., alternating current connects of the AC/DC electrical connector does not electrically engage the contacts of the DC electrical connector. When AC electrical connector is coupled to the AC/DC electrical connector, the alternating current contacts and the ground contacts of the AC/DC electrical connector engage corresponding electrical contacts of the AC electrical connector. The AC/DC electrical connector can also be provided with a sensor in the form of a pilot contact or reed switches for determining whether direct electrical current or alternating electrical current is being supplied thereto.

30 Claims, 17 Drawing Sheets

UNIVERSAL ELECTRICAL CONNECTOR FOR RECEIVING DC AND AC ELECTRICAL CONNECTORS

FIELD OF THE INVENTION

This invention relates to an electrical connector for receiving direct electrical current (DC) as well as alternating electrical current (AC). The electrical connector of this invention is especially useful in recharging electric vehicles. More specifically, this invention relates to an electrical connector electrically coupled to a battery recharging circuit for recharging the battery of an electric vehicle. The electrical connector is capable of receiving a high level DC charge as well as a low level AC charge.

BACKGROUND OF THE INVENTION

The number of automobiles being operated in the world is continuing to increase. This increase in automobiles has significantly increased the worldwide air pollution problem. In order to control this air pollution problem from automobiles, many countries have begun to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers' ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

Preferably, recharging stations should also be available at the residences of owners of electric vehicles so that they may charge their electric vehicles at home as well as at various locations away from the owners' homes. Typically, residential homes utilize low amperage alternating current which can only provide a slow or low level charge for recharging the electric vehicle commercial recharging stations, on the other hand, can typically be equipped with high amperage direct electrical current which can provide a fast or high level charge for recharging electric vehicles. Therefore, it would be highly desirable to have electric vehicles which are capable of selectively receiving direct electrical current for a fast, high level charge as well as alternating electrical current for a slow, low level charge. In either application, the electrical connectors for the recharging station and the electric vehicle should operate in substantially the same manner in which gas powered vehicles are refueled.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the contact surface of the vehicle is exposed to the environment which can cause the electrical contact surfaces of the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes.

Accordingly, many attempts have been made to use inductive power couplings to recharge the batteries of an electric vehicle. Inductive power couplings transfer power from a power source to the vehicle by means of a magnetic field that extends through an air gap. However, these inductive power couplings have certain disadvantages. For example, research is currently being conducted on the harmful effects on humans of magnetic fields, such as created by inductive couplings. Moreover, existing inductive power couplings are not capable of transferring high amperage which is necessary to provide a fast charge to the vehicle's battery.

Examples of inductive power couplings are disclosed in the following patents: U.S. Pat. No. 4,347,472 to Lemelson; U.S. Pat. No. 4,800,328 to Bolger et al; U.S. Pat. No. 5,157,319 to Klonte et al; Japanese patent application 63-287607 to Matsuoka; German patent 23 30 255; and Japanese patent application 58-69404 to Yamada.

In view of the above, it is apparent that there exists a need for an electrical connector assembly for transferring energy by conduction to electric vehicles from electrical recharging stations which will overcome the above problems of the prior art, and which are safe and convenient to operate as well as capable of selectively receiving both direct electrical current and alternating electrical current. This invention addresses these needs in the art along with other needs which will become apparent to those skilled in the art once given this disclosure.

SUMMARY OF THE INVENTION

Accordingly, an object of the present invention is to provide a universal electrical connector for receiving either direct electrical current or alternating electrical current.

An object of the present invention is to provide an electrical connector assembly, especially for electric vehicles, which is safe and convenient to operate.

Another object of the present invention is to provide an electrical connector having its contacts covered or concealed from the user to avoid accidental contact by the user.

Another object of the present invention is to provide an electrical connector assembly having a plug which can be inserted into a receptacle with little or no force.

Another object of the present invention is to provide an electrical connector assembly having a plug with a first set of contacts and a receptacle with a second set of contacts in which both sets of contacts remain covered until after full insertion of the plug into the receptacle.

Yet another object of the present invention is to provide an electrical connector assembly in which the contacts of the plug and the contacts of the receptacle move in a direction transverse to the direction of insertion of the plug into the receptacle.

Another object is to provide electrical connectors for electric vehicles or electric recharging stations which are relatively inexpensive and simple to manufacture.

The foregoing objects are basically attained by providing, a universal AC/DC electrical connector for selectively receiving direct electrical current and alternating electrical current, comprising: an insulated housing; two direct current contacts coupled to the housing for receiving direct electrical current from a mating DC electrical connector electrically coupled to a source of direct electrical current; and two alternating current contacts coupled to the housing for receiving alternating electrical current from a mating AC electrical connector electrically coupled to a source of alternating electrical current.

The foregoing objects can further be attained by an electrical connector for mating with electrical contacts of a universal AC/DC electrical connector, comprising: an insulated housing with at least four contact openings therein for receiving the electrical contacts of the universal AC/DC electrical connector; a pair of first electrical contacts coupled within the insulated housing for transmitting electrical current to the universal AC/DC electrical connector, each of the first electrical contacts being aligned with one of the contact opening in the housing; a pair of contactless recesses formed inside of the housing and being aligned with two of the contact openings for receiving a pair of the electrical contacts of the universal AC/DC electrical connector; and a contact cover movably coupled to the housing for selectively covering the contact openings in a first position and exposing the contact openings in a second position.

The foregoing objects can also be attained by providing an electric vehicle adapted to selectively receive direct electrical current and alternating electrical current, comprising: a rechargeable battery for powering the electric vehicle; a microprocessor electrically coupled to the rechargeable battery for regulating electrical current being supplied to the rechargeable battery; and an electrical connector electrically coupled to the microprocessor and the rechargeable battery for receiving electrical current to recharge the rechargeable battery, the electrical connector including, a housing coupled to the electric vehicle, two direct current contacts coupled to the housing for receiving direct electrical current from a mating DC electrical connector electrically coupled to a source of direct electrical current, and two alternating current contacts coupled to the housing for receiving alternating electrical current from a mating AC electrical connector coupled to a source of alternating electrical current.

The foregoing objects can further be attained by a method of selectively receiving direct electrical current from a DC electrical connector and alternating electrical current from an AC electrical connector, comprising the steps of providing a universal AC/DC electrical connector with a housing for alternatively coupling with the DC electrical connector and the AC electrical connector; providing the housing with a direct electrical current path for selectively receiving direct electrical current from the DC electrical connector; and providing the housing with an alternating electrical current path for selectively receiving alternating electrical current form the AC electrical connector.

Other objects, advantages and salient features of the invention will become apparent from the following detailed description, which, taken in conjunction with the annexed drawings, discloses two preferred embodiments of the invention.

BRIEF DESCRIPTION OF THE DRAWINGS

Referring to the drawings which form a part of this original disclosure.

DETAILED DESCRIPTION OF THE DRAWINGS

Figure 1:
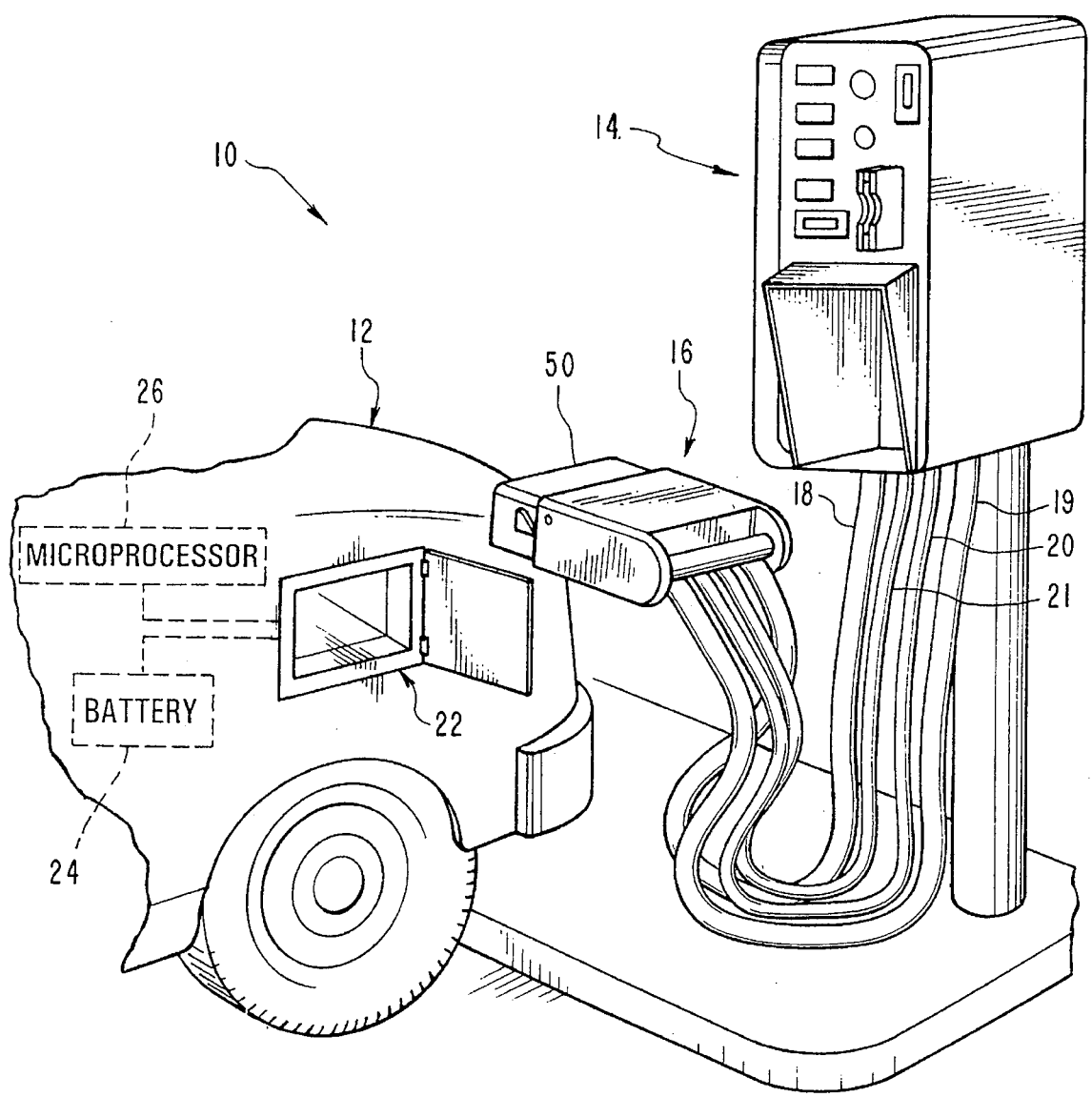
FIG. 1 is a partial perspective view of an electrical connector assembly in accordance with a first embodiment of the present invention and illustrated in connection with an electric vehicle and an electric recharging station.

Referring initially to FIGS. 1–5, an electrical connector assembly 10 especially designed for use with an electric car or vehicle 12 and a recharging station or power source 14 is illustrated in accordance with a first embodiment of the present invention. Electrical connector assembly 10 is designed to handle both direct electrical current and alternating electrical current. Electrical connector assembly 10 includes a first direct current (DC) electrical connector 16 (FIGS. 1 and 2) and a first alternating current (AC) electrical connector 16' (FIG. 3) coupled to either a DC or an AC recharging station or power source 14 for dispensing either direct electrical current via cables 18–21 or alternating current via cables 18'–21', and a second, universal AC/DC electrical connector 22 mounted in electric vehicle 12 and coupled to a battery 24 located in vehicle 12 for receiving electrical energy from electrical connector 16 to recharge battery 24.

Figure 4:
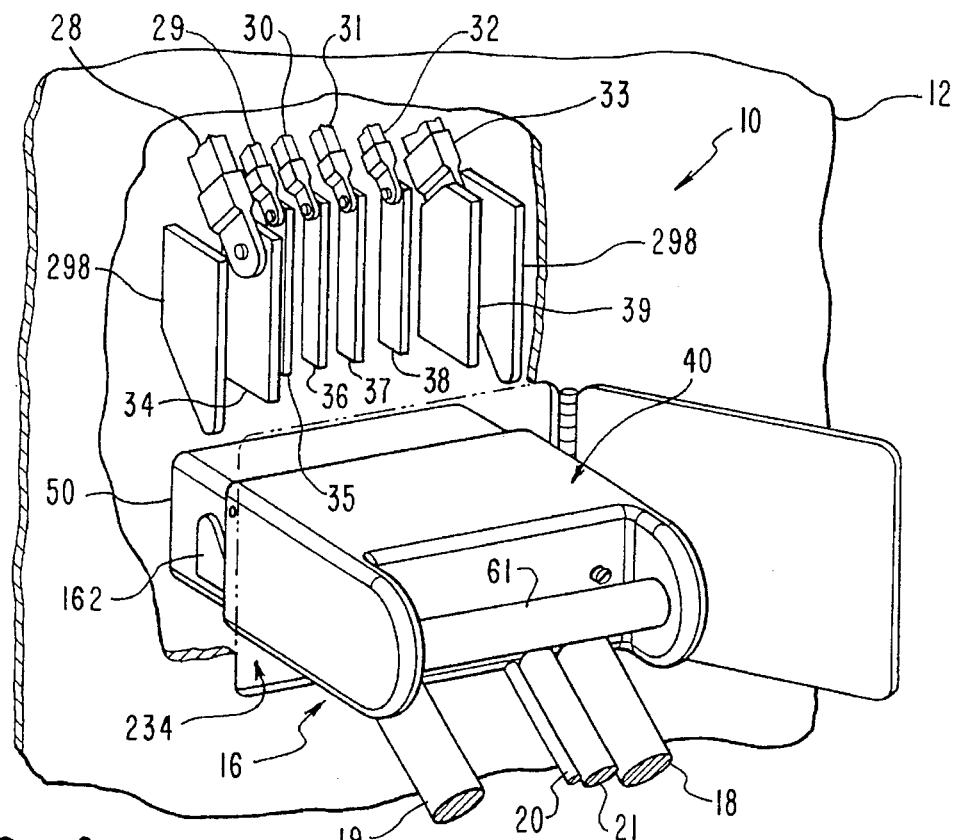
FIG. 4 is a schematic rear perspective view of the DC electrical connector being inserted into the inlet cavity of the AC/DC electrical connector of the vehicle in accordance with the present invention prior to electrical engagement between the contacts.
Figure 5:
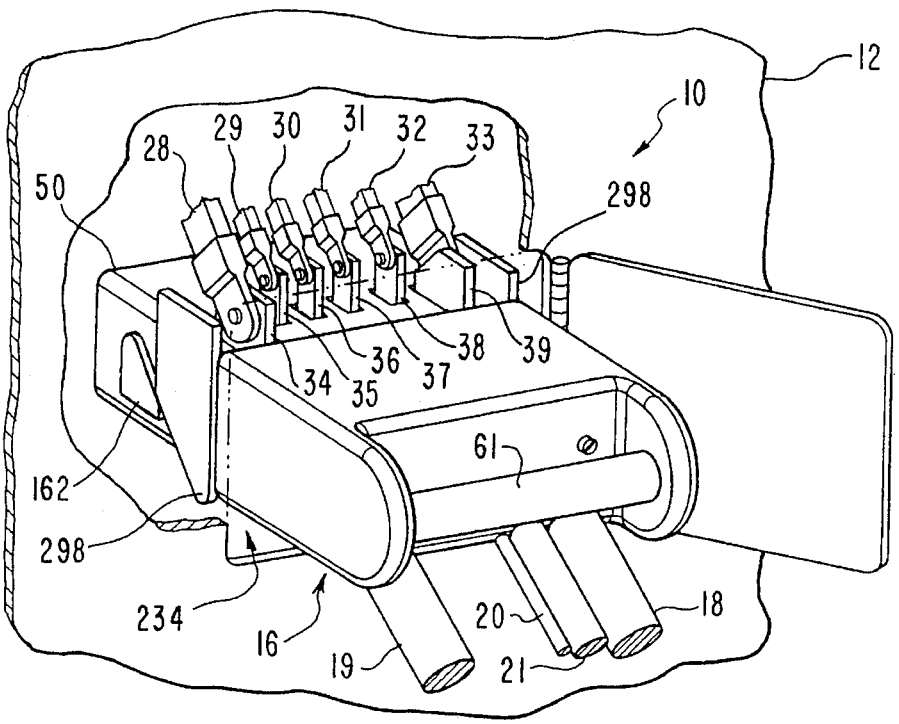
FIG. 5 is a schematic rear perspective view of the DC electrical connector or plug and AC/DC electrical connector illustrated in FIG. 4 with the contacts of the AC/DC electrical connector electrically coupled to the contacts of the DC electrical connector.
Figure 6:
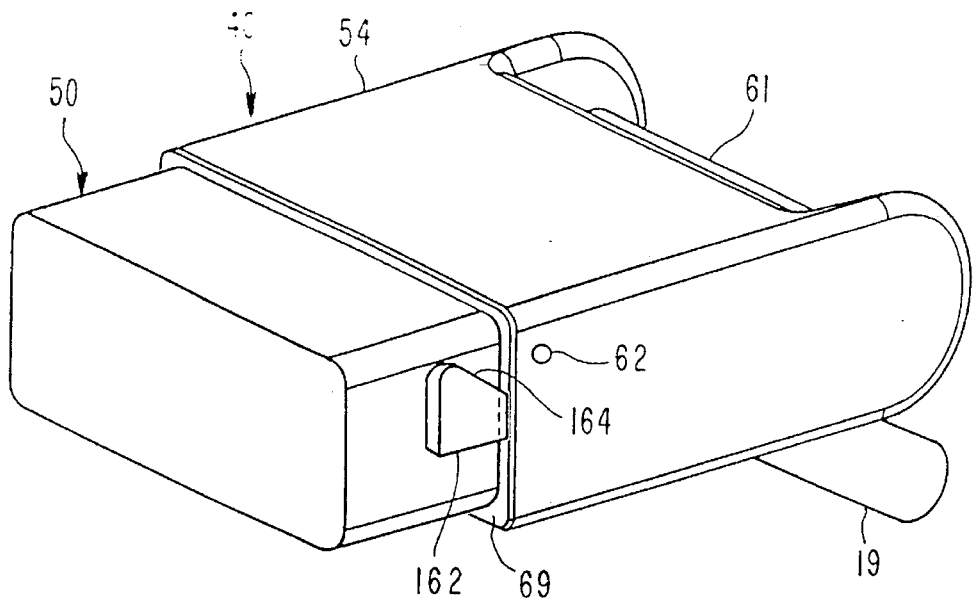
FIG. 6 is front perspective view of the DC electrical connector or plug illustrated in FIGS. 1, 2, 4 and 5 in accordance with the present invention.
Figure 7:
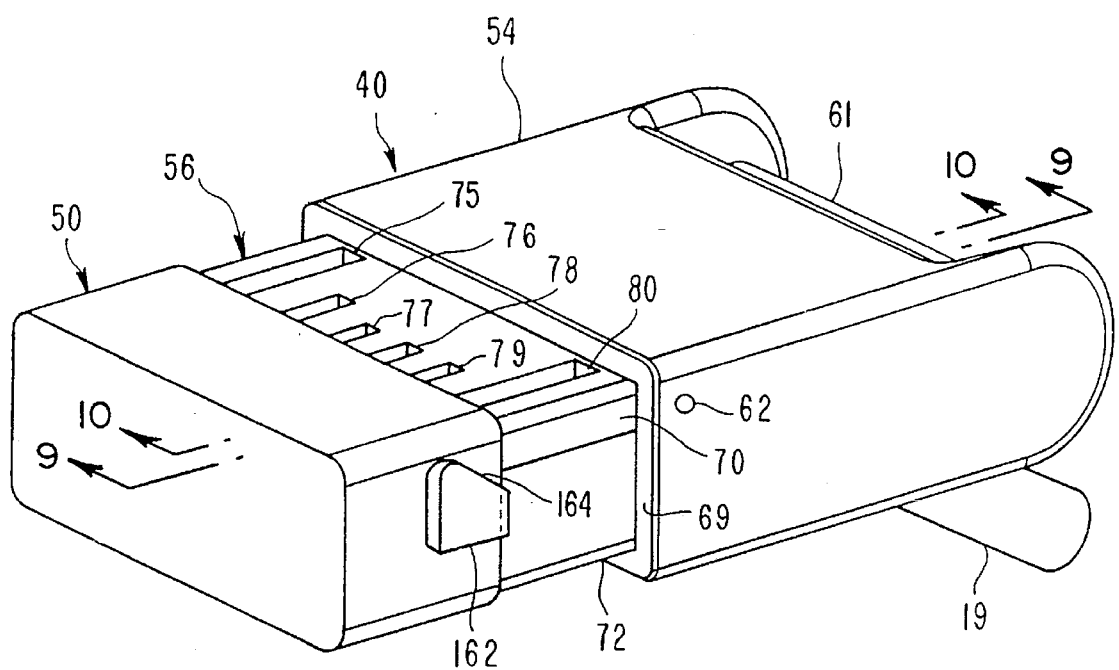
FIG. 7 is a front perspective view of the DC electrical connector or plug illustrated in the FIG. 6 with its contact cover moved to an extended position for exposing its electrical contacts contained therein.

Accordingly, electrical connector assembly 10 permits electric vehicle 12 to be recharged with either direct electrical current (DC) or alternating electrical current (AC). In other words, AC/DC electrical connector 22 is designed to receive both DC electrical connector 16 and AC electrical connector 16', while electrical connectors 16 and 16' are designed to receive both AC electrical contacts as well as DC electrical contacts, but only electrical engage the appropriate electrical contacts as seen in FIGS. 4 and 5. Accordingly, AC/DC electrical connector 22 is electrically coupled to battery 24 and microprocessor 26 via cables 28–33 which are in turn electrically coupled to contacts 34–39 for receiving both DC current and AC current, as discussed below in more detail.

In particular, contacts 34 and 39 are designed for receiving DC current while contacts 35 and 36 are designed for receiving AC current. Contact 37 is designed to transmit informational data between AC/DC electrical connector 22 and electrical connectors 16 and 16'. Contact 38 is a ground contact for grounding AC/DC electrical connector 22 during both DC recharging and AC recharging. The DC contacts 34 and 39 are the outermost contacts located adjacent the sides of AC/DC electrical connector 22 to allow for heat dissipation. In other words, DC contacts 34 and 39 receive the highest level of current running therethrough and should be located as close as possible to the exterior AC/DC electrical connector 22 to prevent heat build up within AC/DC electrical connector 22.

In the preferred embodiment, electrical connectors 16 and 16' are constructed as plugs, while electrical connector 22 is constructed as a receptacle adapted to selectively receive electrical connectors 16 and 16' therein. The electrical connector assembly 10 also includes an on-board microprocessor or computer 26 with a conventional recharging circuit located in vehicle 12 for transmitting and receiving data to and from power source 14 to recharge battery 24 and to control the operation of electrical connector assembly 10 as discussed below in more detail.

Figure 21:
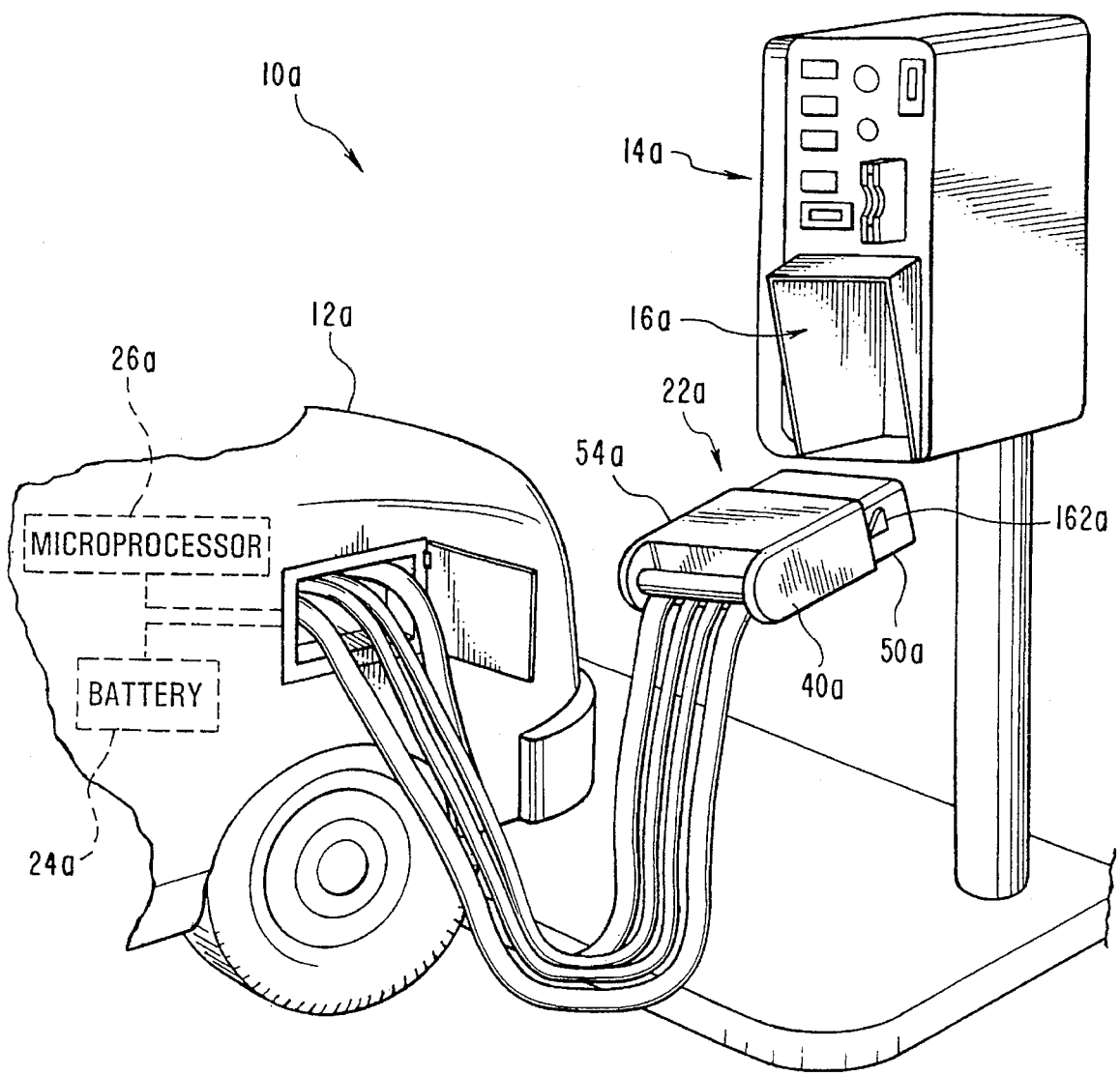
FIG. 21 is a partial perspective view of an electrical connector assembly in accordance with a second embodiment of the present invention and illustrated in connection with an electric vehicle and an electric recharging station.
Figure 22:
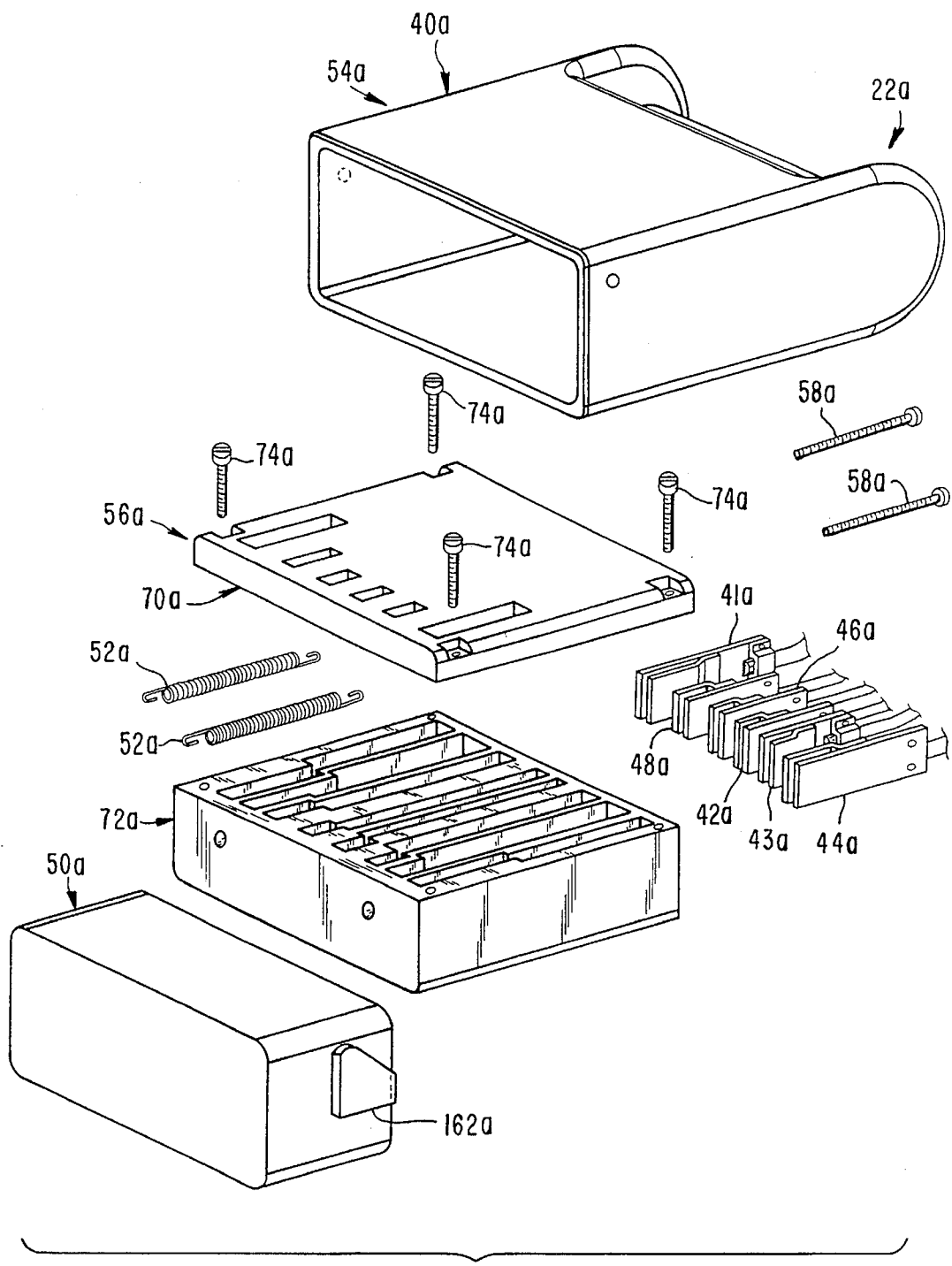
FIG. 22 is an exploded perspective view of the universal AC/DC electrical connector illustrated in FIG. 20 in accordance with the present invention.

While electrical connectors 16, 16' and 20 are illustrated in conjunction with an electric vehicle 12 and a recharging station 14, it will become apparent from this disclosure that electrical connectors 16, 16' and 22 can be used in other electrical systems and in a variety of applications. Moreover, it will be apparent to those skilled in the art that electrical connectors 16 and 16' can be formed as receptacles and electrical connector 22 can be formed as a retractable plug as seen in FIGS. 21 and 22 discussed below. In other words, electrical connector 22 can be constructed substantially identical to electrical connector 16 or 16', except that electrical connector 22 would have both direct current (DC) and alternating current (AC) contacts, while electrical connectors 16 and 16' would be constructed substantially identical to electrical connector 22 as described below, except that they would only have either DC contacts or AC contacts.

Power source or recharging station 14 is preferably connected to a local electrical utility company's power line or to any other conventional source of electrical energy. Recharging station 14 can be mounted in practically any convenient location, including residential houses, apartment buildings, gas stations, parking garages or even at the side of a curb so that power can be readily available to vehicle 12.

In commercial applications as seen in FIG. 1, recharging station 14 can be constructed to use similar electronics as used in today's automated gas stations. For example, recharging station 14 can be provided with a conventional power meter for determining the amount of electrical energy dispensed, a credit card or debit card slot for payment of dispensed energy, and any other of the similar type of conveniences provided at automated gas stations. The electronics and circuits, which can be used for operating recharging station 14 in commercial applications, are fairly conventional and well known, i.e., similar electric circuits are currently used to operate gas station pumps. Thus, the electronics and circuitry for recharging station 14 will not be discussed or illustrated in detail herein.

In the commercial applications, it will be desirable to charge the electric vehicle 12 with high DC current to obtain a fast charge. Thus, DC electrical connector 16 is used to supply high DC current to universal AC/DC electrical connector 22.

In residential applications, recharging station 14 can be electrically connected in a conventional manner to a circuit breaker panel or power meter in a residential home or an apartment. Since residential homes and apartments typically use alternating current (AC), AC electrical connector 16' is used to supply alternating current to universal AC/DC electrical connector 22 of the vehicle 12.

Electrical connections, breaker panels, and/or power meters are all conventional equipment which is well known to those skilled in the electric vehicle art, and thus, they will not be discussed or illustrated in detail herein. Likewise, electric vehicle 12 with battery 22 and microprocessor 24 are also all conventional and/or well known, and thus, they also will not be discussed or illustrated in detail herein.

Electrical Connectors 16 and 16'

Figure 2:
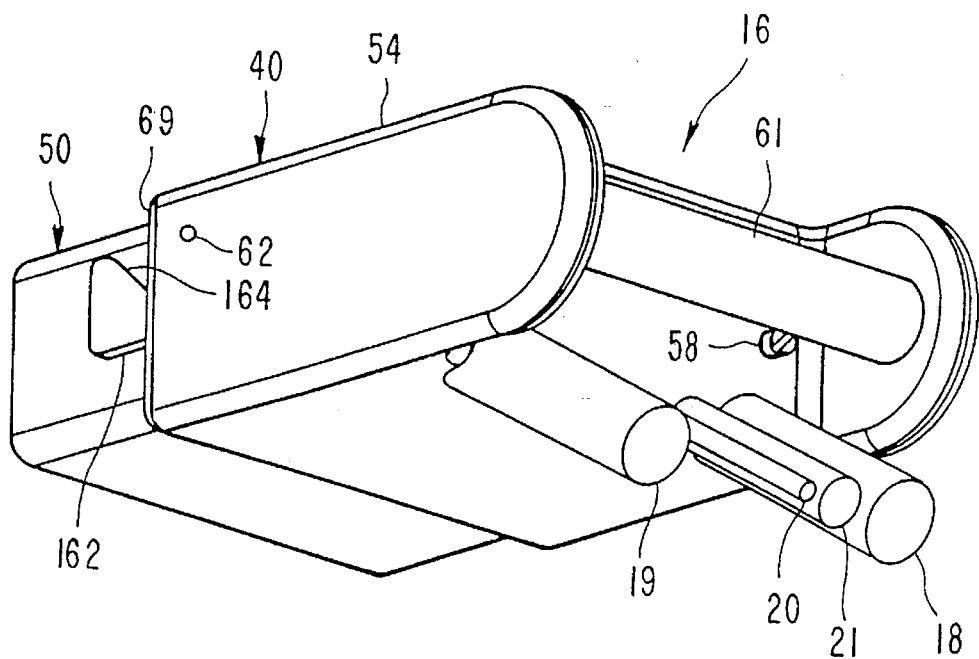
FIG. 2 is a rear perspective view of the DC electrical connector or plug illustrated in FIG. 1 in accordance with the present invention.
Figure 3:
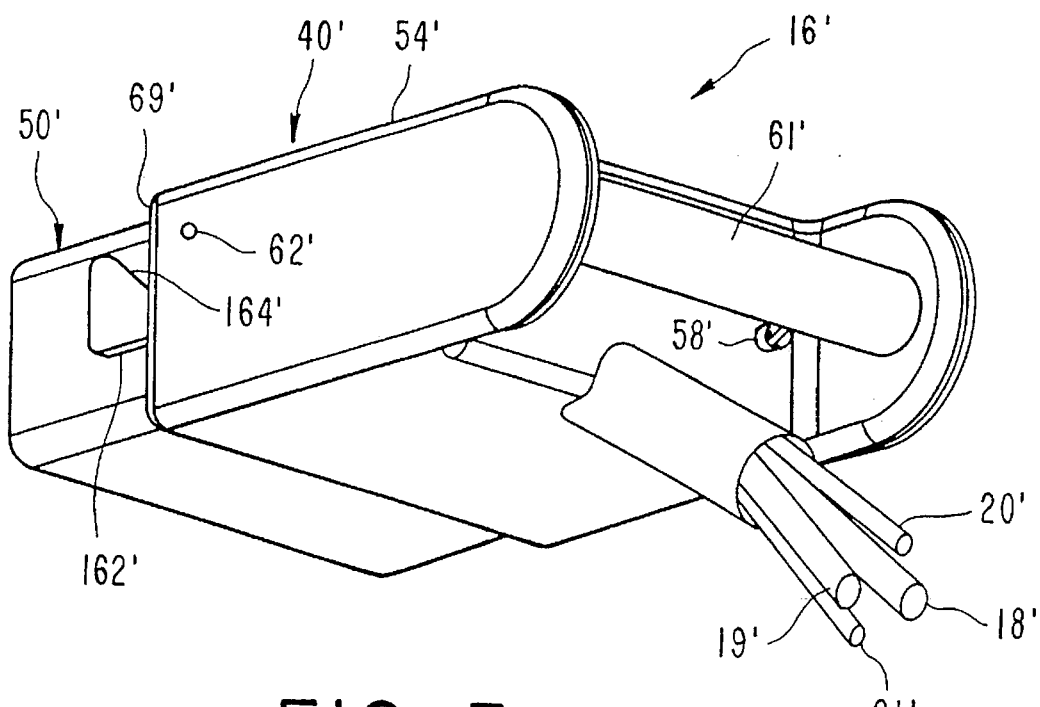
FIG. 3 is a rear perspective view of the AC electrical connector in accordance with the present invention.
Figure 8:
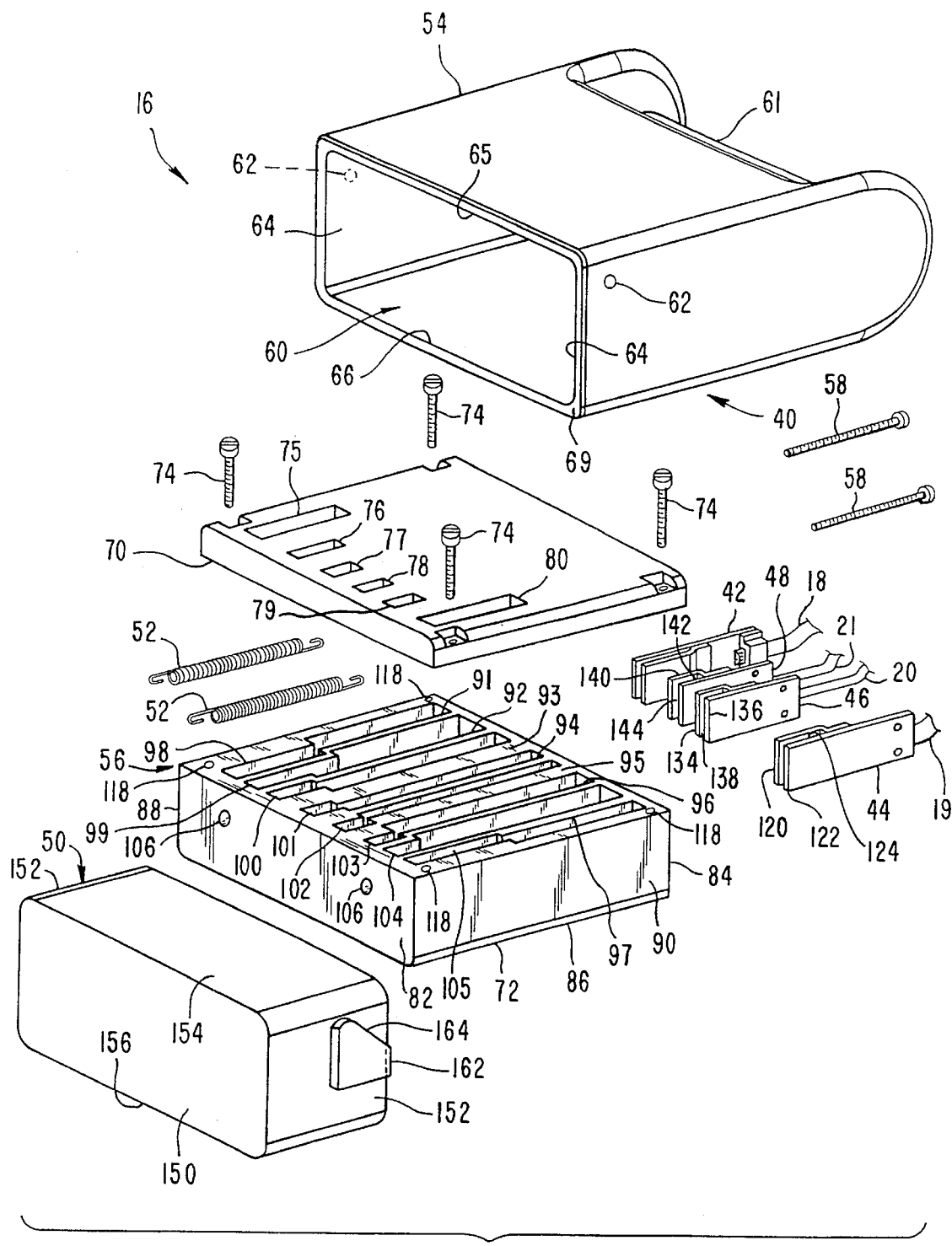
FIG. 8 is an exploded perspective view of the DC electrical connector or plug illustrated in FIGS. 4–7.

Referring now to FIGS. 2 and 8, electrical connector 16 includes an insulated housing 40, a pair of power contacts 42 and 44 for supplying direct electrical current to DC contacts 34 and 39 of electrical connector 22, a pilot contact or sensor 46 for engaging contact 37 of electrical connector 22 to provide informational data therebetween, a ground contact 48 for engaging ground contact 38 of electrical connector 22, a movable contact cover 50, and biasing means such as a pair of tension springs 52 for slidably coupling contact cover 50 to insulated housing 40 and for biasing contact cover 50 to a first or closed position covering the contacts 42–48. A rectangular gasket 53 is provided between contact cover 50 and insulated housing 40 to provide a weather-tight seal therebetween as discussed below.

Electrical connector 16', on the other hand, includes an insulated housing 40', a pair of power contacts 42' and 44' for supplying alternating electrical current to AC contacts 35 and 36 of electrical connector 22, a pilot contact or sensor 46' for engaging contact 37 of electrical connector 22 to provide informational data therebetween, a ground contact 48' for engaging ground contact 38 of electrical connector 22, a movable contact cover 50', and biasing means such as a pair of tension springs 52' for slidably coupling contact cover 50' to insulated housing 40' and for biasing contact cover 50' to a first or closed position covering the contacts 42'–48'.

The only significant differences between DC electrical connector 16 and AC electrical connector 16' are the size and location of the power contacts and the shape of the insulated housing for accommodating the different size cables. More specifically, DC electrical connector 16 has large DC power contacts 42 and 44 located adjacent the sides of housing 40 which are coupled to DC current via cables 18 and 19, while AC electrical connector 16' has smaller AC power contacts 42' and 44' located inwardly of DC power contacts 42 and 44 and coupled to AC current via cables 18' and 19'. In other words, insulated housing 40 of DC electrical connector 16 has four individual openings for receiving cables 18–21 therein, while insulated housing 40' of AC electrical connector 16' has a single opening for receiving cables 18'–21' therein.

In view of the similarities between DC electrical connector 16 and AC electrical connector 16', only the structure of electrical connector 16 will be illustrated and described in detail herein. Also, reference numerals with a prime will be used to indicate substantially identical parts common between electrical connectors 16 and 16'.

As seen in FIG. 8, insulated housing 40 of first electrical connectors 16 includes a handle portion 54, a contact retainer body 56 for supporting its contacts 42, 44, 46 and 48 therein. A pair of screws 58 releasably couples handle portion 54 to contact retainer body 56. Preferably, handle portion 54 and contact retainer body 56 are each constructed of an insulating material such as a hard, rigid, non-conductive plastic.

Handle portion 54 includes a cavity 60 with its opening located at one end of handle portion 54 for receiving a portion of contact retainer body 56 therein, and a handle 61 at the other end of handle portion 54 for gripping electrical connector 16. Handle portion 54 may optionally be provided with a pair of magnets 62 with one of the magnets 62 being located on each side of handle portion 54 adjacent the opening of cavity 60 as discussed below.

Figure 9:
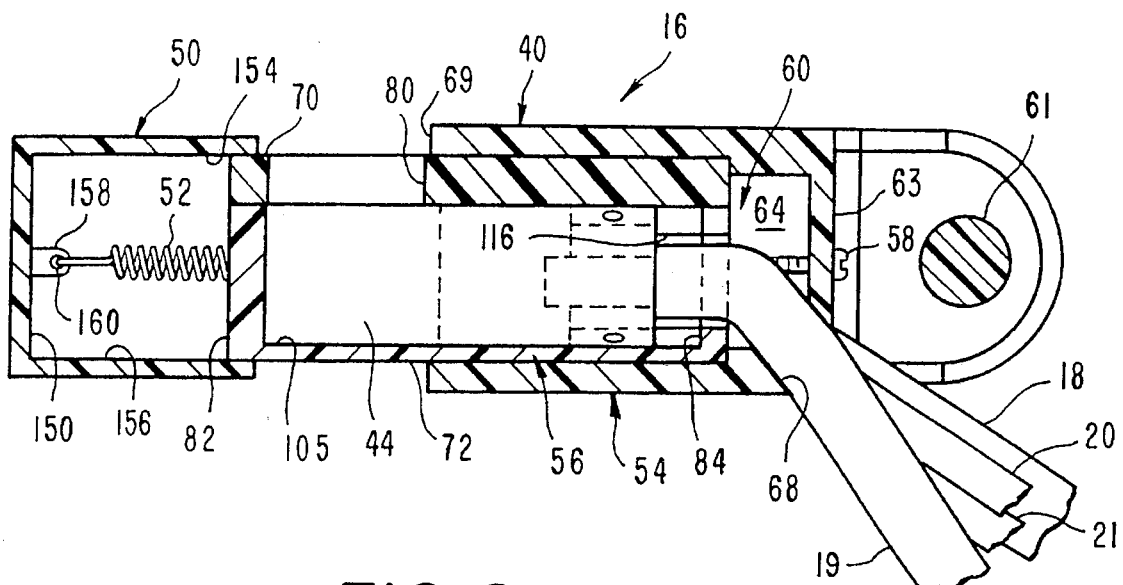
FIG. 9 is a cross-sectional view of the DC electrical connector taken along section line 9—9 of FIG. 7 with one of its DC contacts shown in elevation.
Figure 10:
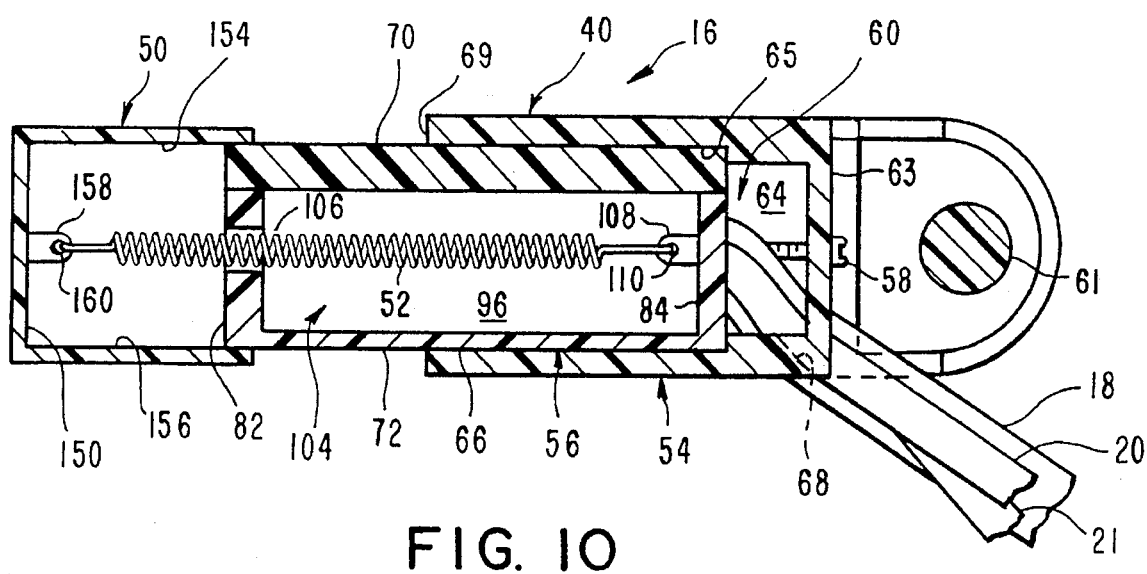
FIG. 10 is a cross-sectional view of the DC electrical connector of FIG. 7 taken along section line 10—10.

As seen in FIGS. 8–10, cavity 60 has a substantially rectangular cross section sized slightly larger than the outer cross-sectional dimensions of contact retainer body 56 for receiving a portion of contact retainer body 56 therein. Cavity 60 has an end wall 63, a pair of parallel side walls 64 extending substantially perpendicular to end wall 63, a top wall 65 extending substantially perpendicular to end wall 63 and side walls 64, and a bottom wall 66 extending substantially perpendicular to end wall 63 and side walls 64.

As seen in FIGS. 8 and 9, end wall 63 of cavity 60 has a pair of holes (not shown) for receiving screws 58 therethrough to releasably fasten handle portion 54 and contact retainer body 56 together. Bottom wall 66 of cavity 60 has four cable bores 68 for receiving cables 18–21 therethrough. Bores 68 vary in size depending on the size of cables 18–21. The four free edges of walls 63–65 which form the opening of cavity 60 also form a rectangular abutment surface 69. Gasket 53 overlies abutment surface 69 for engaging contact cover 50, when contact cover 50 is positioned over contact retainer body 56 to cover or conceal contacts 42, 44, 46 and 48. Thus, cover 50 compresses gasket 53 against abutment surface 69 for creating a weather-tight seal between the interface of contact cover 50 and insulated housing 40.

As seen in FIGS. 8 and 9, contact retainer body 56 houses contacts 42, 44, 46 and 48 together with the ends of cables 18–21 which are electrically coupled to contacts 42, 44, 46 and 48 in a conventional manner. Contact retainer body 56 includes an upper half or portion 70 and a lower half or portion 72 releasably coupled to upper portion 70 by four screws 74. Upper portion 70 has six slots 75–80 for receiving the contacts 34–37 of AC/DC electrical connector 22 therethrough as discussed below, and four holes for receiving screws 74 therethrough.

Lower portion 72 has a front wall 82, a rear wall 84, a bottom wall 86, and a pair of side walls 88 and 90. Seven dividers 91–97 extend upwardly from bottom wall 86 and perpendicularly between front wall 82 and rear wall 84 and substantially parallel to side walls 88 and 90. Dividers 91–97 divides lower portion 72 into eight longitudinally extending recesses 98–105 for receiving the two tension springs 52 and the four contacts 42, 44, 46 and 48 of DC electrical connector 16 therein. Specifically, recesses 99 and 104 are sized to receive tension springs 52, while recesses 98, 102, 103 and 105 are sized and notched to receive and fixedly secure contacts 42, 44, 46 and 48 therein. More specifically, recesses 98, 102, 103 and 105 are sized slightly larger than their respective contacts to prevent relative movement therein. Recesses 101 and 102 remain empty in DC electrical connector 16 since recesses 101 and 102 are designed to receive the AC power contacts 35 and 36 of AC/DC electrical connector 22.

Front wall 82 of lower portion 72 has a pair of openings 106, which are aligned with recesses 99 and 104, respectively, for receiving tension springs 52 therethrough. In particular, tension springs 52 are coupled at one of their ends to lower portion 72 of contact retainer body 56 at rear wall 84 and then they extend through openings 106 of front wall 82 so that the tension springs 52 are coupled at their other ends to contact cover 50. Accordingly, contact cover 50 is spring biased to contact retainer body 56 so as to normally cover the portion of contact retainer body 56 extending outwardly from handle portion 54. In other words, contact cover 50 is normally held against abutment surface 69 of handle portion 54 by tension springs 52 to cover contacts 42, 44, 46 and 48.

As seen in FIG. 10, rear wall 84 of lower portion 72 has a pair of tabs 108 with one of the tabs 108 being positioned in recess 99 and the other of tabs 108 being positioned in recess 104. Each of the tabs 108 is aligned with one of the openings 106 formed in front wall 82, and has a hole 110 for receiving one end of one of the tension springs 52. As seen in FIG. 9, rear wall 84 also has six circular openings 116 (only one shown) with each of the openings 116 being aligned with one of the recesses 98, 100–103 and 105. Openings 116 are sized to receive cables 18–21 therethrough so that cables 18–21 are electrically coupled to contacts 42, 44, 46 and 48 in a conventional manner.

As seen in FIG. 8, lower portion 72 is also provided with four threaded bores 118 with one of the threaded bores being located at each of the corners of lower portion 72 for threadedly receiving screws 74 to releasably secure upper portion 70 of contact retainer body 56 to lower portion 72 of contact retainer body 56. When upper portion 70 is fastened to lower portion 72 via screws 74, slots 75–80 of upper portion 70 will align with recesses 99, 100–103 and 105 of lower portion 72 so that contacts 42, 44, 46 and 48 in the case of DC electrical connector 16 can be engaged through slots 75 and 78–80.

As seen in FIG. 8, contacts 42 and 44 are preferably spring contacts which are coupled to power cables 18 and 21 for receiving a high level DC charge such as 400 amps of direct current. Each of the contacts 42 and 44 has a pair of parallel blades 120 and 122 which are spaced apart to form a slot 124 for receiving a mating blade contact of second electrical connector 22 as discussed below. Contacts 42 and 44 are constructed of any highly conductive metallic material suitable for transmitting direct current.

Figure 11:
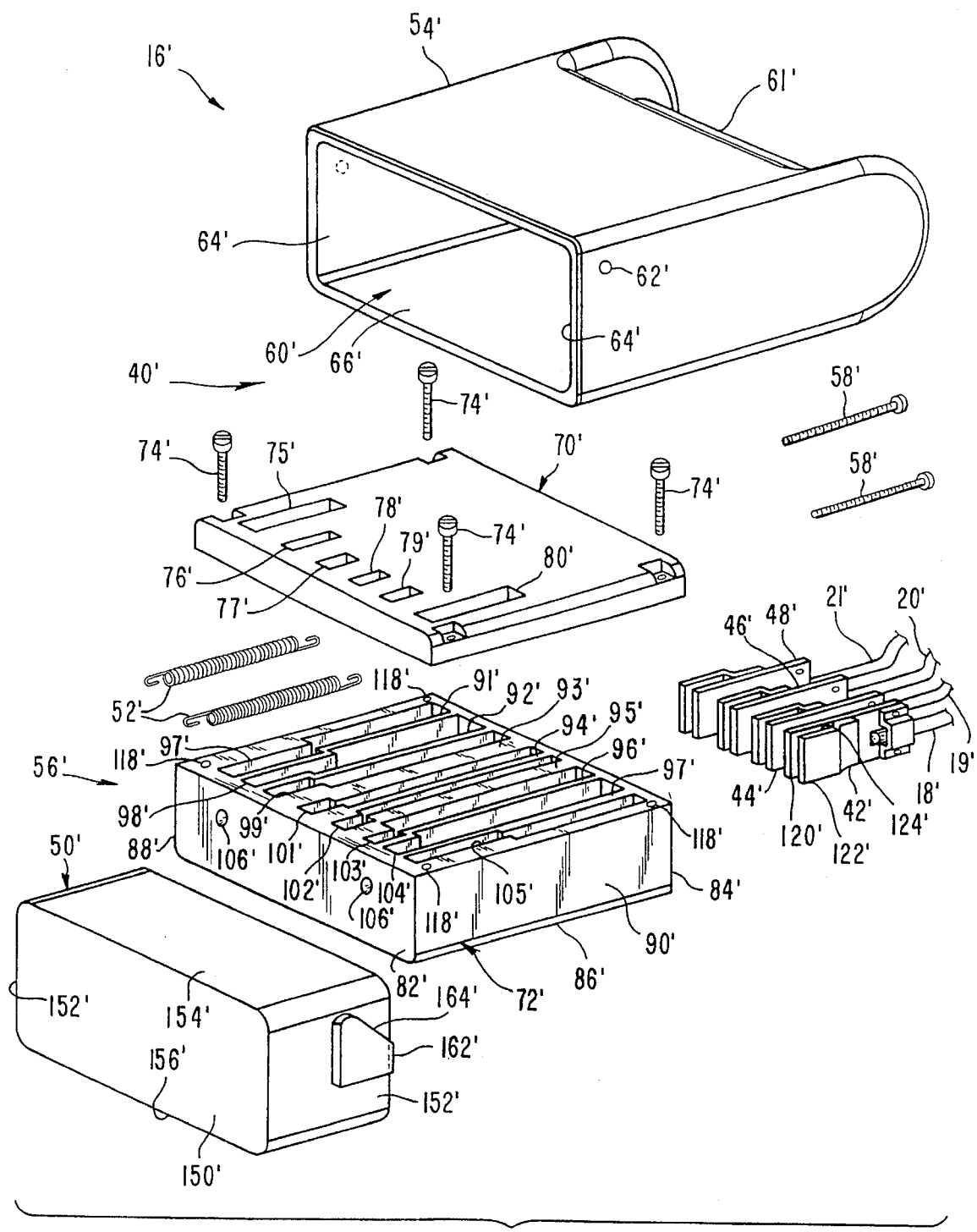
FIG. 11 is an exploded perspective view of the AC electrical connector or plug illustrated in FIG. 3 in accordance with the present invention.

As seen in FIG. 11, contacts 42' and 44' of electrical connector 16' are electrically coupled to power cables 18' for receiving alternating current such as 40 amps of alternating current. Contacts 42' and 44' are electrically coupled to cables 18' and 19' in a conventional manner, and thus these connections will not be discussed in detail herein. Contacts 42' and 44' are constructed of any conductive metallic material which is suitable for transmitting alternating electrical current. Since contacts 42' receive a low level alternating current as opposed to the high level direct current of contacts 42, contacts 42' are smaller than the direct current contacts 42. Contacts 42' are also spring contacts having a pair of parallel blades 120' and 122' which are spaced apart to form a slot 124' for receiving an electrical contact of second electrical connector 22 as discussed below.

Pilot contact 46 and ground contact 48 are also spring type contacts made of any conductive metallic material suitable for electrical contacts. Pilot contact 46 has a pair of parallel blades 134 and 136 which are spaced apart to form a slot 138. Ground contact 48 has a pair of parallel blades 140 and 142 which are spaced apart to form a slot 144 which receives the ground contact of second electrical connector 22.

Pilot contact 46 transfers electrical data from electrical connector 16 to electrical connector 22 when coupled thereto. Pilot contact 46 provides information between charging station 14 and microprocessor 26 such as the type of electrical current (AC/DC), the status of charging of battery 24, billing information, customer identification. While pilot contact 46 is shown as a single contact, it will be apparent from this disclosure that pilot contact 46 can be substituted with a plurality of contacts for providing such information or other types of sensors or means can be provided for providing information between charging station 14 and microprocessor 26 of vehicle 12.

As seen in FIGS. 8–10, contact cover 50 is preferably made of an insulated material such as plastic. In particular, contact cover 50 can be formed as a unitary, integral one-piece member from a hard, rigid, nonconductive plastic material. Contact cover 50 has an end wall 150, a pair of parallel side walls 152 extending substantially perpendicular from opposite ends of end wall 150, a top wall 154 extending between side walls 152 and substantially perpendicular thereto, and a bottom wall 156 extending substantially parallel to top wall 154 and substantially perpendicular to side walls 152. Accordingly, contact cover 50 is a substantially rectangular cup-shaped member with an open end for receiving a portion of contact retainer body 56 therein. The open end of cover 50 is defined by a flat annular abutment edge which engages gasket 53.

As seen in FIGS. 9 and 10, contact cover 50 is biased by a biasing member to a closed position for normally covering contacts 42–48 of DC electrical connector 16. For example, end wall 150 can have a pair of tabs 158 (only one shown) with each having a hole 160 therein for receiving one end of one of the tension springs 52.

Of course, it will be apparent to those skilled in the art that other biasing means can be utilized for biasing contact cover 50 to its closed position by modifying cover 50 and/or other parts of electrical connector 16. For example, any type of spring means can be utilized such as a torsion spring, a compression spring, etc.

Contact cover 50 is preferably sized to be received over contact retainer body 56 in a telescoping manner to cover slots 75–80. In particular, contact cover 50 is coupled to contact retainer body 56 by tension springs 52 so that contact cover 50 is normally held against gasket 53, which overlies abutment surface 69 of handle portion 54, so as to cover and seal the contacts 42, 44, 46 and 48 of DC electrical connector 16 from the environment. Abutment surface 69 and the front edge of contact cover 50 are both flat annular surfaces. Accordingly, a good, tight seal is easily obtained between the interface of contact cover 50 and insulated housing 40 by using flat, annular gasket 53 therebetween.

Side walls 152 of contact cover 50 are each provided with a cam member 162 which is positioned adjacent the free edge of side walls 152. Cam members 162 are substantially identical and each are preferably shaped as right triangles with a cam surface 164 formed along their hypotenuse. Cam surfaces 164 are designed to be engaged by a part of second electrical connector 22 for moving contact cover 50 from a closed position covering the contacts to an open position exposing the contacts as discussed below in more detail.

Electrical Connector 22

As seen in FIG. 1, AC/DC electrical connector 22 is preferably coupled to an electric vehicle 12 for charging battery 24 of the electric vehicle 12. In particular, electrical connector 22 is designed to receive either DC electrical connector 16 or AC electrical connector 16' so that the vehicle 12 may be charged by either using a high level DC charge or using a low level AC charge.

Figure 12:
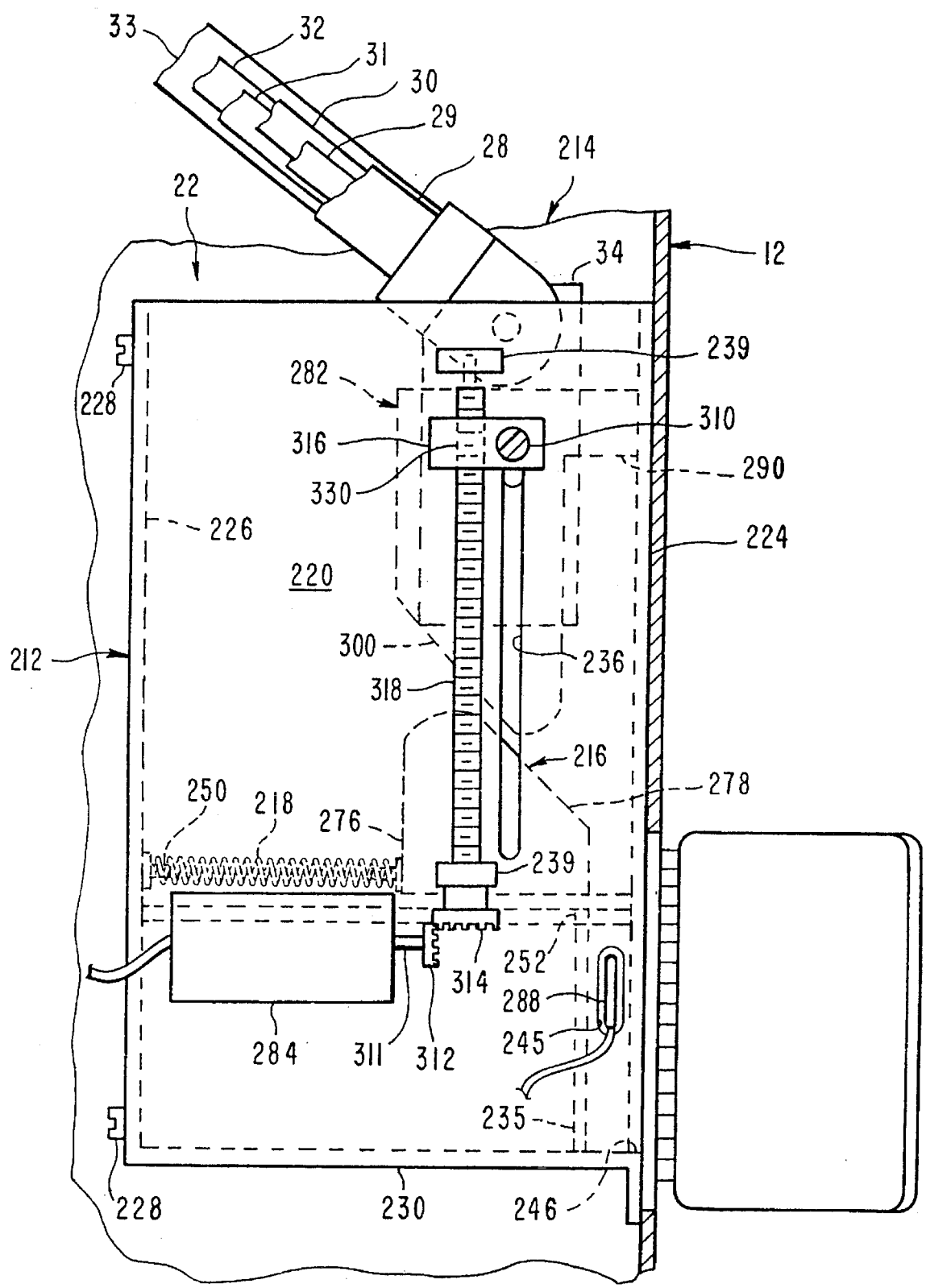
FIG. 12 is a left side elevational view of the universal AC/DC electrical connector in accordance with the present invention.
Figure 13:
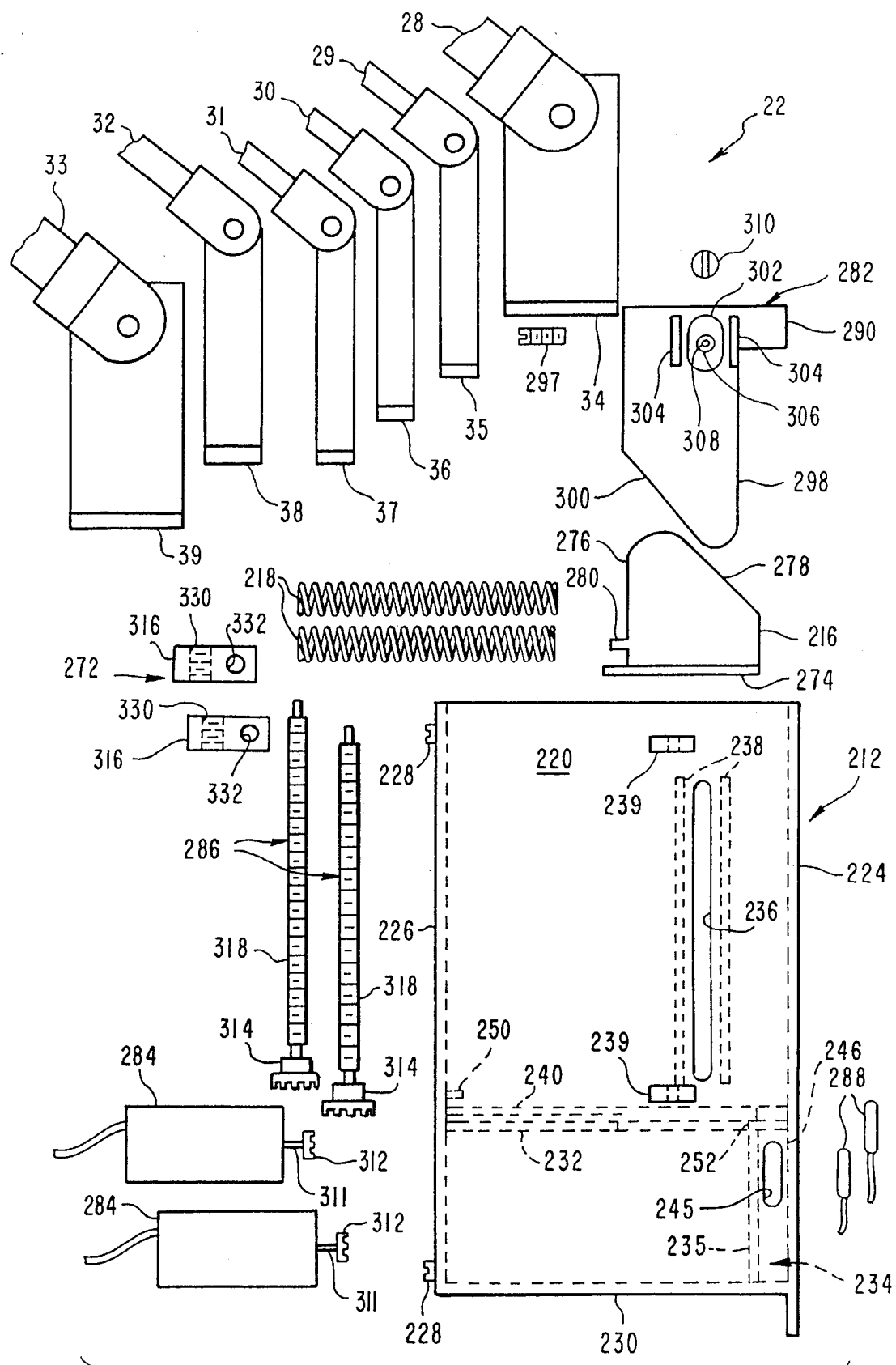
FIG. 13 is an exploded left side elevational view of the universal AC/DC electrical connector illustrated in FIG. 12 in accordance with the present invention.
Figure 14:
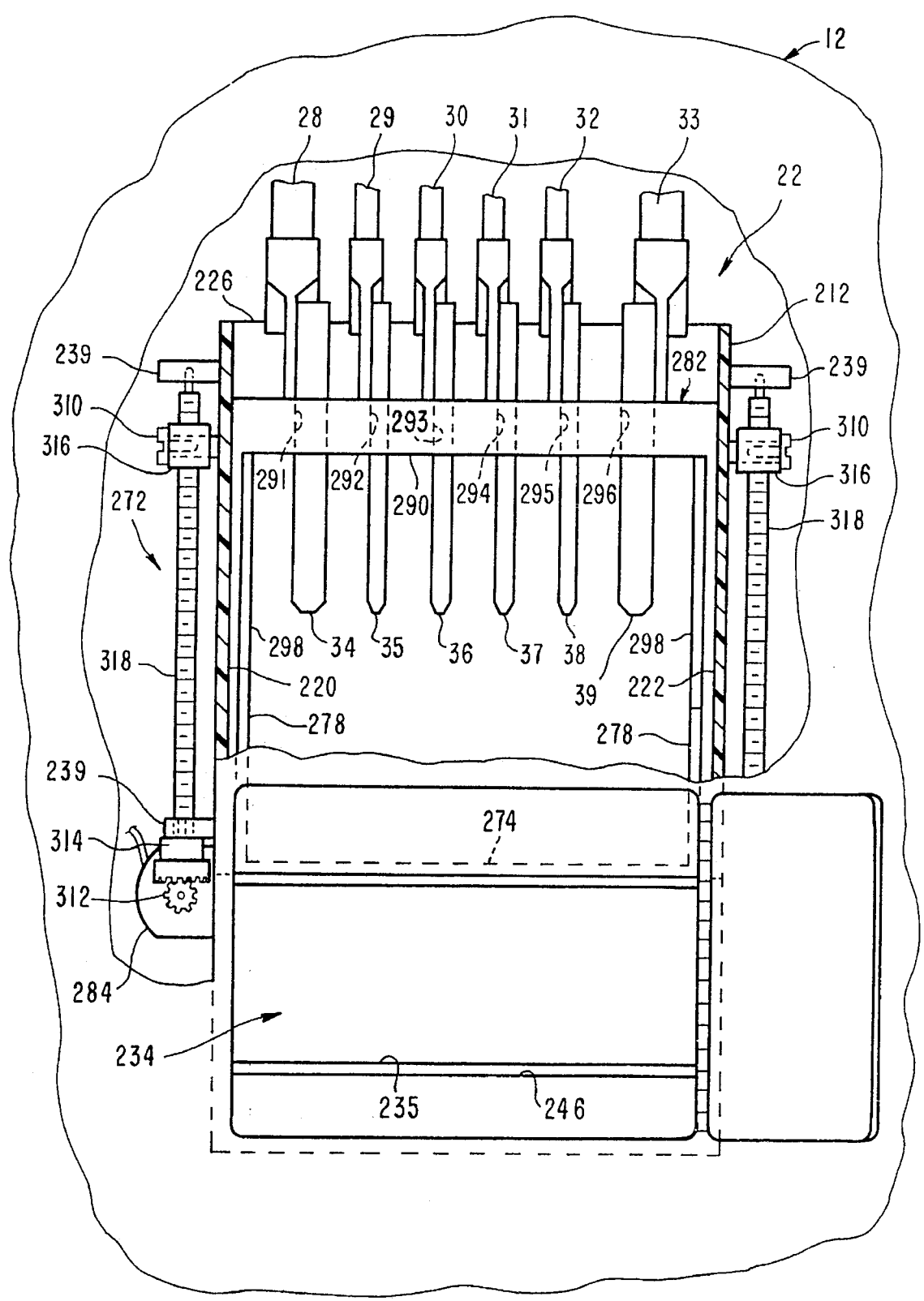
FIG. 14 is a front elevational view of the universal AC/DC electrical connector coupled to the electric vehicle with portions of the universal AC/DC electrical connector and the electric vehicle broken away for clarity to illustrate the contacts and drive mechanism of the AC/DC electrical connector of the present invention.

Referring now to FIGS. 12–14, electrical connector 22 includes an insulated inlet housing 212 fixedly coupled to vehicle 12, an AC/DC contact assembly 214 coupled to battery 24 and microprocessor 26 via cables 28–33 in a conventional manner, a contact cover 216 movably coupled to inlet housing 212 for covering the contacts contained therein, and a pair of compression springs 218 coupled between inlet housing 212 and contact cover 216 for biasing contact cover 216 to a closed position for covering the contacts of electrical connector 22.

Figure 15:
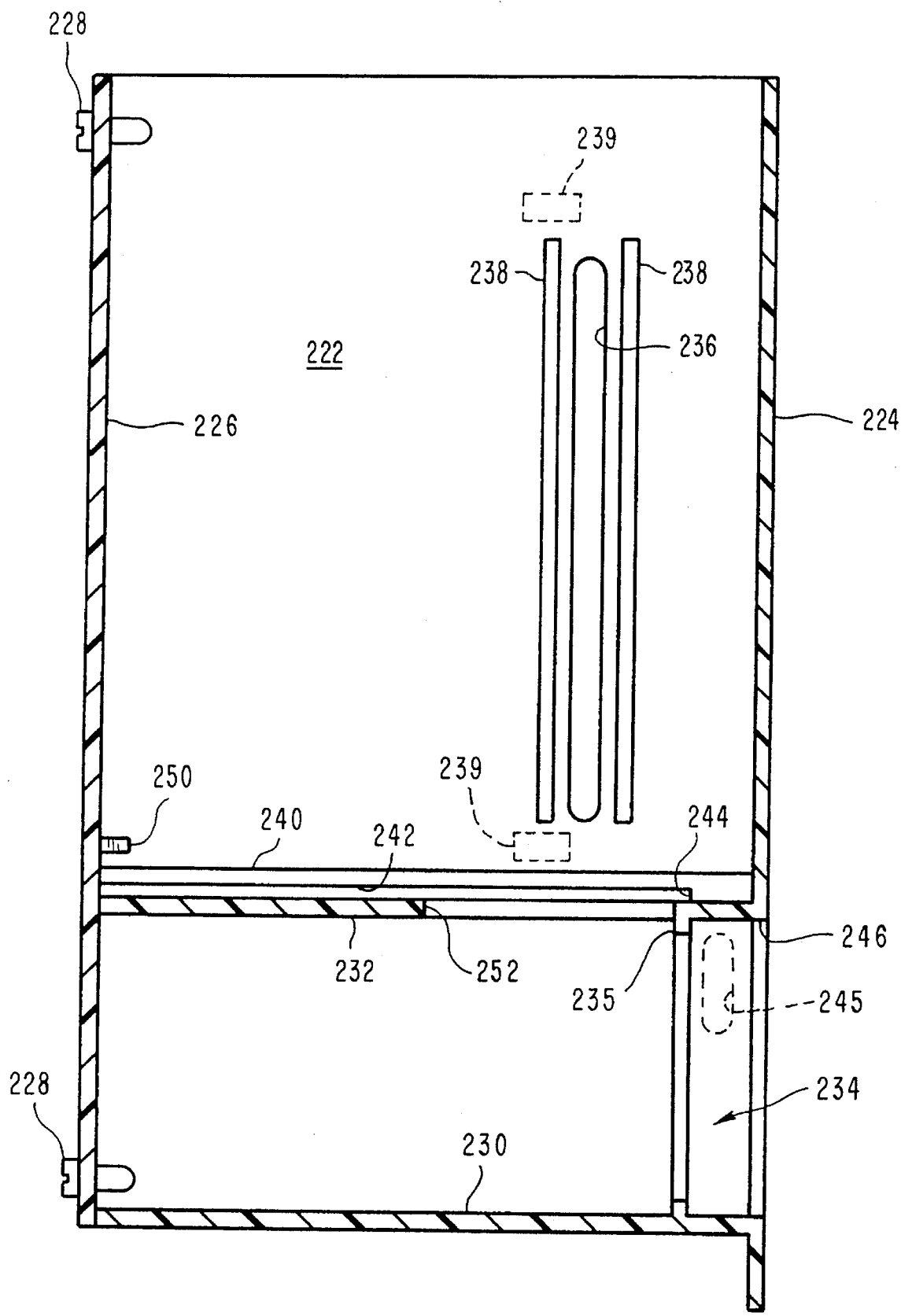
FIG. 15 is a longitudinal cross-sectional view of the inlet housing of the AC/DC electrical connector taken along a vertical plane extending through the center of the inlet housing.

As seen in FIG. 15, housing 212 is preferably constructed of a hard, rigid, non-conductive plastic material, and includes a pair of parallel side walls 220 and 222, a front wall 224 extending substantially perpendicularly between side walls 220 and 222, a removable rear wall 226 extending substantially perpendicular between side walls 220 and 222 and coupled thereto by screws 228, a bottom wall 230 extending substantially perpendicular to side walls 220 and 222, front wall 224 and rear wall 226, and an intermediate wall 232 extending substantially parallel to bottom wall 230 for forming an inlet cavity 234 between bottom wall 230 and intermediate wall 232.

Inlet cavity 234 is sized to selectively receive DC electrical connector 16 as well as AC electrical connector 16' therein. Electrical connectors 16 and 16' can be inserted into inlet cavity 234 with little or no force since inlet cavity 234 has no obstructions. In other words, the contacts of AC/DC electrical connector 22 are retracted and concealed within inlet housing 212 so that no electrical connection is made during insertion of either electrical connector 16 or 16' into inlet cavity 234. Inlet cavity 234 has an annular abutment flange 235 extending inwardly from walls 220, 222, 230 and 232 for limiting inward movement of electrical connectors 16 or 16' into inlet cavity 234. In particular, abutment surface 69 or 69' of electrical connector 16 or 16' engages abutment flange 235 upon full insertion of electrical connector 16 or 16' into inlet cavity 234 of AC/DC electrical connector 22.

Side walls 220 and 222 of inlet housing 212 are substantially identical, and thus, the same reference numerals will be used to identify identical parts. Side walls 220 and 222 each includes a vertical slot 236 and a pair of vertical rails 238 for slidably supporting AC/DC contact assembly 214 for vertical movement between a retracted position and an extended position. A pair of support blocks 239 are fixed coupled to each of the side walls 220 and 222 for supporting a part of AC/DC contact assembly 214 as discussed below. Side walls 220 and 222 also includes a horizontal rail 240 extending substantially parallel to intermediate wall 232 and spaced above intermediate wall 232 to form a slot 242 for slidably receiving contact cover 216 therein. A stop 244 is formed between each of the horizontal rails 240 and intermediate wall 232 adjacent front wall 224 for limiting the forward movement of contact cover 216. A recess 245 is also formed in the exterior surface of each of the side walls 220 and 222 for receiving sensors 288 as discussed below.

Front wall 224 of inlet housing 212 is integrally formed with side walls 220 and 224 as well as integrally formed with bottom wall 230 and intermediate wall 232. Front wall 224 has an inlet opening 246 aligned with inlet cavity 234 for receiving electrical connectors 16 and 16' therein. Inlet opening 246 is substantially rectangular with its upper edge coinciding with the bottom surface of intermediate wall 232 and its lower edge coinciding with the upper surface of bottom wall 230. The side edges of inlet opening 246 are preferably spaced slightly inwardly from side walls 220 and 222.

Rear wall 226 of inlet housing 212 is preferably removably coupled to side walls 220 and 224 by four screws 228 in a conventional manner. Rear wall 226 has a pair of tabs 250 (only one shown) with one of the tabs 250 being located adjacent side wall 220 and the other of the tabs 250 being located adjacent side wall 222. The tabs 250 are also spaced slightly above horizontal rails 240 of side walls 220 and 222. Each of the tabs 250 extends into one end of one of the compression springs 218 for preventing movement therebetween.

Intermediate wall 232 has an opening 252 for permitting the contacts 34–39 of electrical connector 22 to pass therethrough and into inlet cavity 234 as discussed below. Opening 252 lies in a plane extending substantially perpendicular to the plane of inlet opening 246 so that the contacts of electrical connector 22 engage the electrical contacts of electrical connector 16 or 16' in a direction substantially perpendicular to the direction of insertion of electrical connector 16 or 16' into inlet cavity 234 of electrical connector 22.

As seen in FIGS. 12–14, AC/DC contact assembly 214 includes direct electrical current contacts 34 and 39 electrically coupled to cables 28 and 33, respectively, alternating electrical current (AC) contacts 35 and 36 electrically coupled to cables 29 and 30, pilot contact or communication sensor 37 electrically coupled to cable 31, ground contact 38 electrically coupled to cable 32, and a drive mechanism 272 for moving electrical contacts 34–39 into electrical engagement with either electrical contacts 42–48 of electrical connector 16 or electrical contacts 42'–48' of electrical connector 16'.

As seen in FIG. 13, electrical contacts 34–39 are all substantially identical, except for their relative sizes. Contacts 34–39 are all preferably blade contacts constructed of any metallic material suitable for electrical contacts. Contacts 34–39 are preferably vertically movable relative to inlet housing 212 by any drive mechanism such as drive mechanism 272 shown in FIGS. 12–14. Contacts 34–39 are sized to be received in either spring contacts 42–48 of DC electrical connector 16 or spring contacts 42'–48' of AC electrical connector 16'. In particular, when DC electrical connector 16 is inserted into inlet cavity 234 of electrical connector 22, the DC power contacts 34 and 39 of AC/DC electrical connector 22 will engage the two DC power contacts 42 and 44 of AC electrical connector 16, while AC power contacts 35 and 36 of AC/DC electrical connector 22 will engage empty slots 76 and 78. When AC electrical connector 16' is inserted into inlet cavity 234 of electrical connector 22, the AC power contacts 35 and 36 of AC/DC electrical connector 22 will engage the two AC contacts 42' and 44' of AC electrical connector 16' while the DC power contacts 34 and 39 of AC/DC electrical connector 22 will engage empty slots 75 and 80 of AC electrical connector 16'. In either case, pilot contact 37 and ground contact 38 will preferably engage the pilot contact 46 or 46' and the ground contact 48 or 48' of either DC electrical connector 16 or AC electrical connector 16'.

Figure 17:
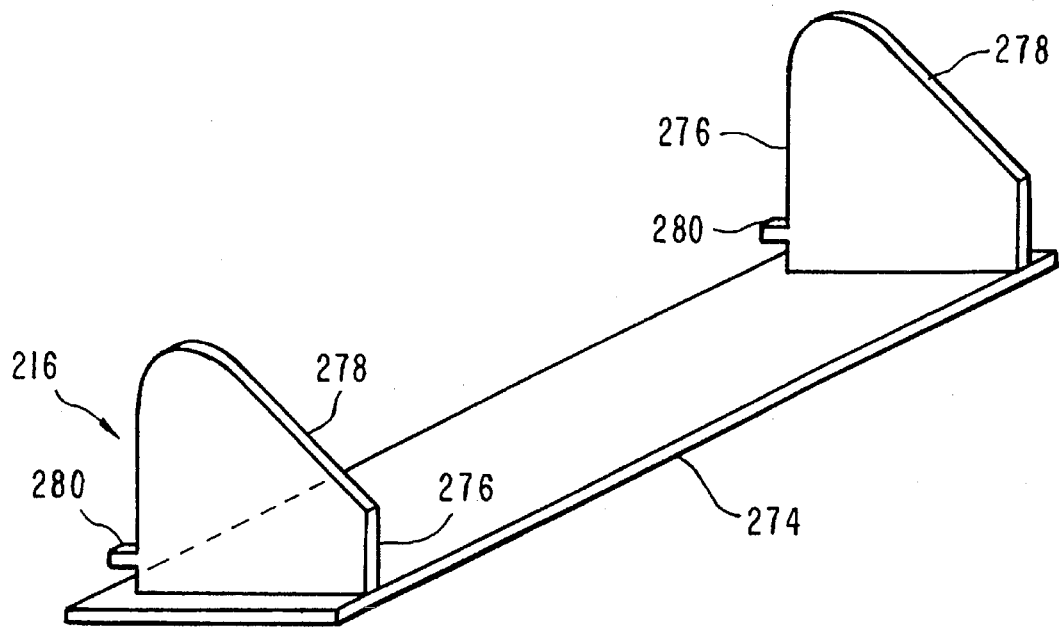
FIG. 17 is a perspective view of the contact cover of the AC/DC electrical connector illustrated in FIGS. 12–14.

As seen in FIGS. 12, 13 and 17, contact cover 216 of AC/DC electrical connector 22 is preferably constructed of an insulated material. For example, contact cover 216 can be constructed of a hard, rigid, non-conductive material such as plastic. Contact cover 216 can be formed as a unitary, one-piece, integral member from a molded plastic. Contact cover 216 is movably coupled to inlet housing 212 for selectively covering opening 252 of intermediate wall 232 so as to cover contacts 34–39 of AC/DC electrical connector 22. While contact cover 216 is shown to be slidably coupled to inlet housing 212, it will be apparent from this disclosure that contact cover 216 can be rotatably coupled to inlet housing 212, pivotally coupled to inlet housing 212 or otherwise movably coupled to inlet housing 212 so as to cover opening 252. Preferably, contact cover 216 is substantially U-shaped having a flat plate or shield portion 274 and a pair of cam plates or legs 276 extending upwardly from opposite ends of shield portion 274.

Cam plates 276 are preferably spaced slightly inwardly from the ends of shield portions 274 so that the ends of shield portion 274 of contact cover 216 are slidably received in slots 242 of side walls 220 and 222. Cam plates 276 are preferably shaped as right triangles with their hypotenuses forming cam surfaces 278. Each of the cam plates 276 also has a tab 280 extending substantially perpendicularly outwardly from their vertical legs. Tabs 280 extend into one end of compression springs 218 which bias contact cover 216 to a position overlying opening 252 formed in intermediate wall 232.

As seen in FIGS. 12 and 13, drive mechanism 272 can be constructed so as to include a contact drive bail 282 slidably coupled to inlet housing 212 for supporting contacts 34–39 during vertical movement of contacts 34–39 between a retracted position and an extended position, one or more electric motors 284 fixedly coupled to the exterior surfaces of side walls 220 and 222 of inlet housing 212 for vertically moving contact drive bail 282 within inlet housing via a pair of screw jacks 286, and a pair of sensors or reed switches 288 fixedly coupled to inlet housing 212 adjacent inlet opening 246.

While a specific drive mechanism 272 has been chosen to illustrate the subject invention, it will be understood by those skilled in the art from this disclosure that various drive mechanisms can be utilized to move the contact covers 50 and 216 as well as to move contacts 34–39. For example, one or more pneumatic or hydraulic cylinders can be used instead of one or more electric motors 284.

Figure 16:
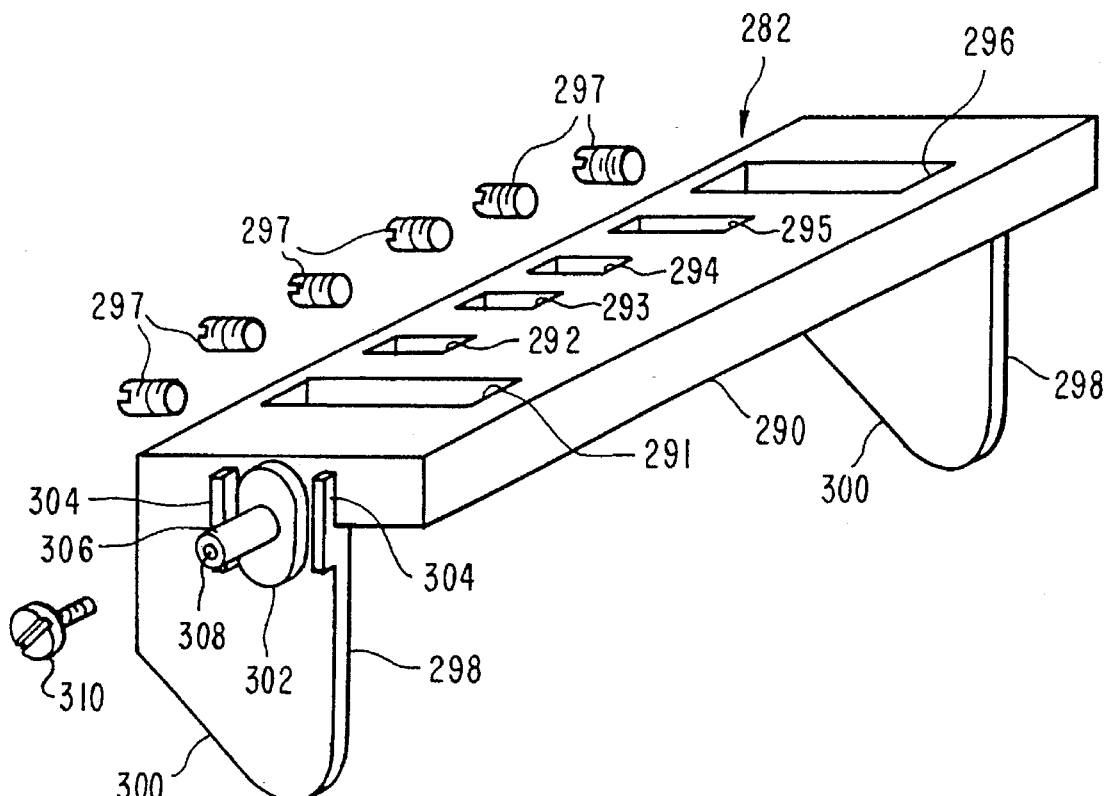
FIG. 16 is an exploded perspective view of the contact drive bail for supporting the contacts of the AC/DC electrical connector illustrated in FIGS. 12–14.

As seen in FIG. 16, contact drive bail 282 is a substantially U-shaped member having a contact carrier 290 with six rectangular slots 291–296 and a pair of cam plates 298 coupled to its opposite ends and extending downwardly therefrom. Contacts 34–39 of AC/DC electrical connector 22 are fixedly secured in a conventional manner to contact drive bail 282 for movement therewith by six set screws 297. In particular, contacts 34–39 are positioned in slots 291–296, respectively, and held in place by set screws 297.

Cam plates 298 are preferably shaped as right triangles with their hypotenuses forming cam surfaces 300 for moving contact covers 50 and 216 from a closed position concealing the contacts 34–39 of electrical connector 22 and the contacts of electrical connector 16 or 16' to an open position for exposing the contacts of electrical connector 22 and the contacts of electrical connector 16 or 16' to each other so that they may be electrically coupled together.

Figure 18:
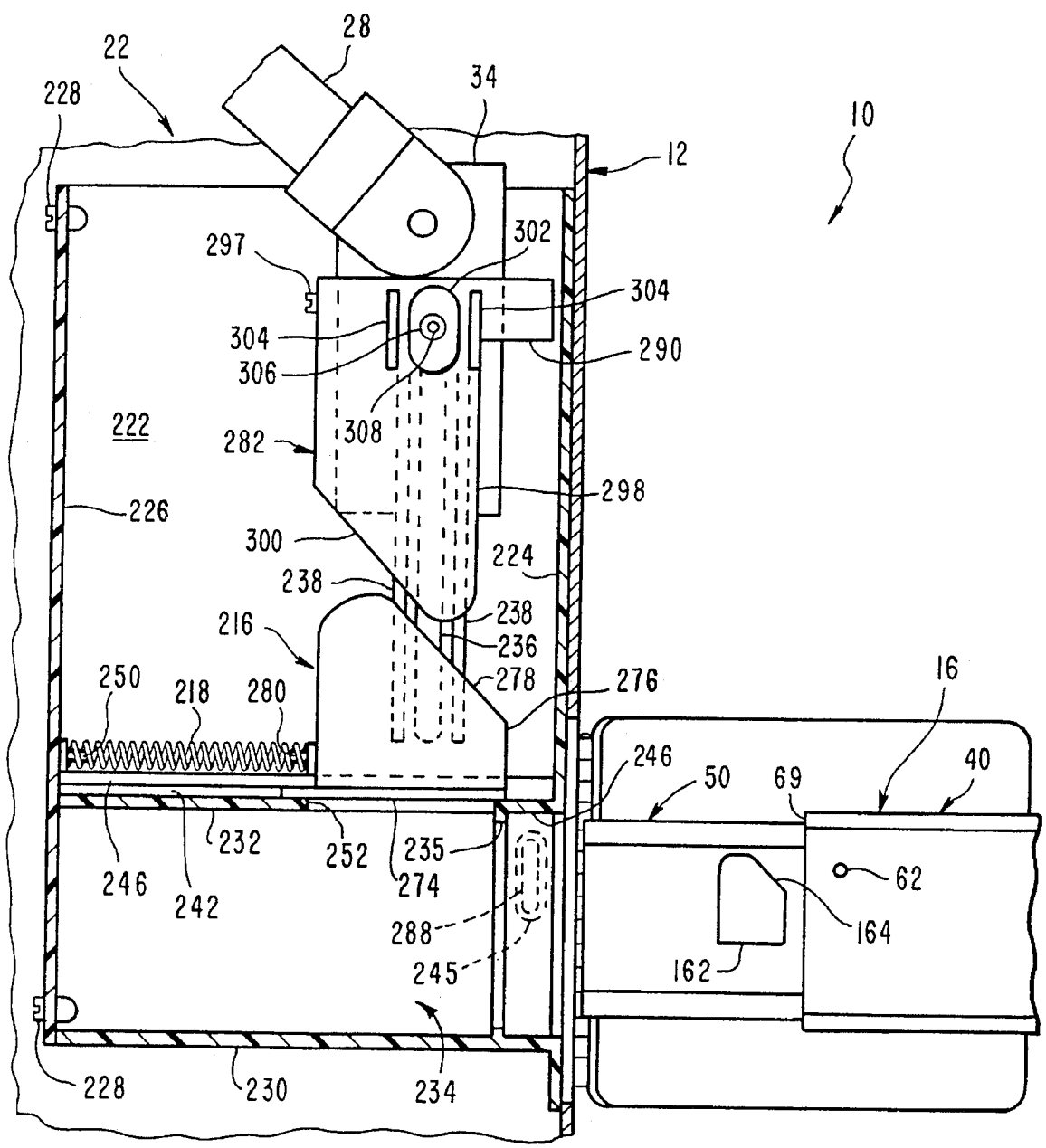
FIG. 18 is a cross-sectional view of the AC/DC electrical connector with the DC electrical connector positioned for insertion into the inlet cavity of the AC/DC electrical connector.
Figure 19:
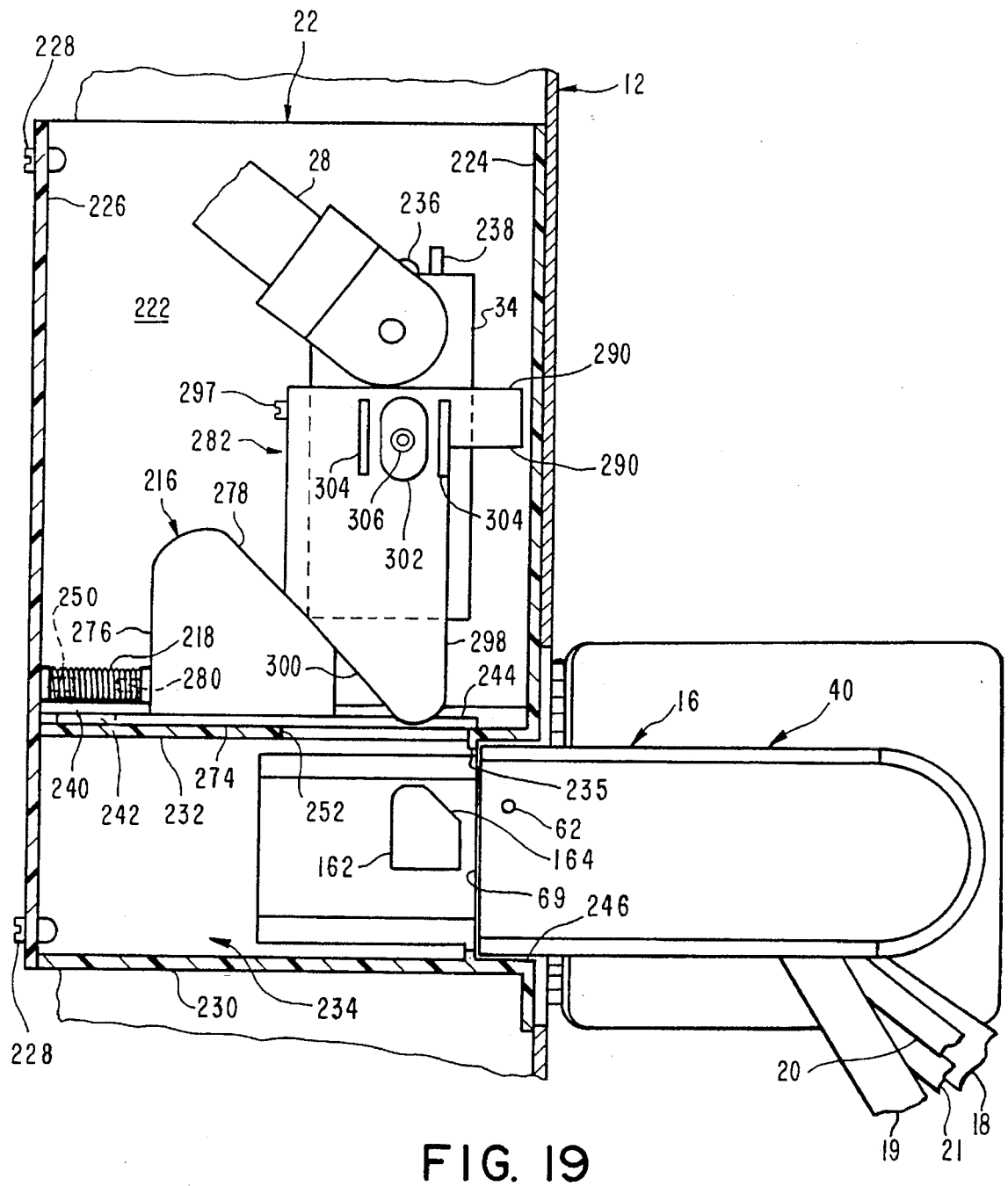
FIG. 19 is a cross-sectional view of AC/DC electrical connector with the DC electrical connector inserted therein and with the contact drive bail engaging the contact cover of the AC/DC electrical connector.
Figure 20:
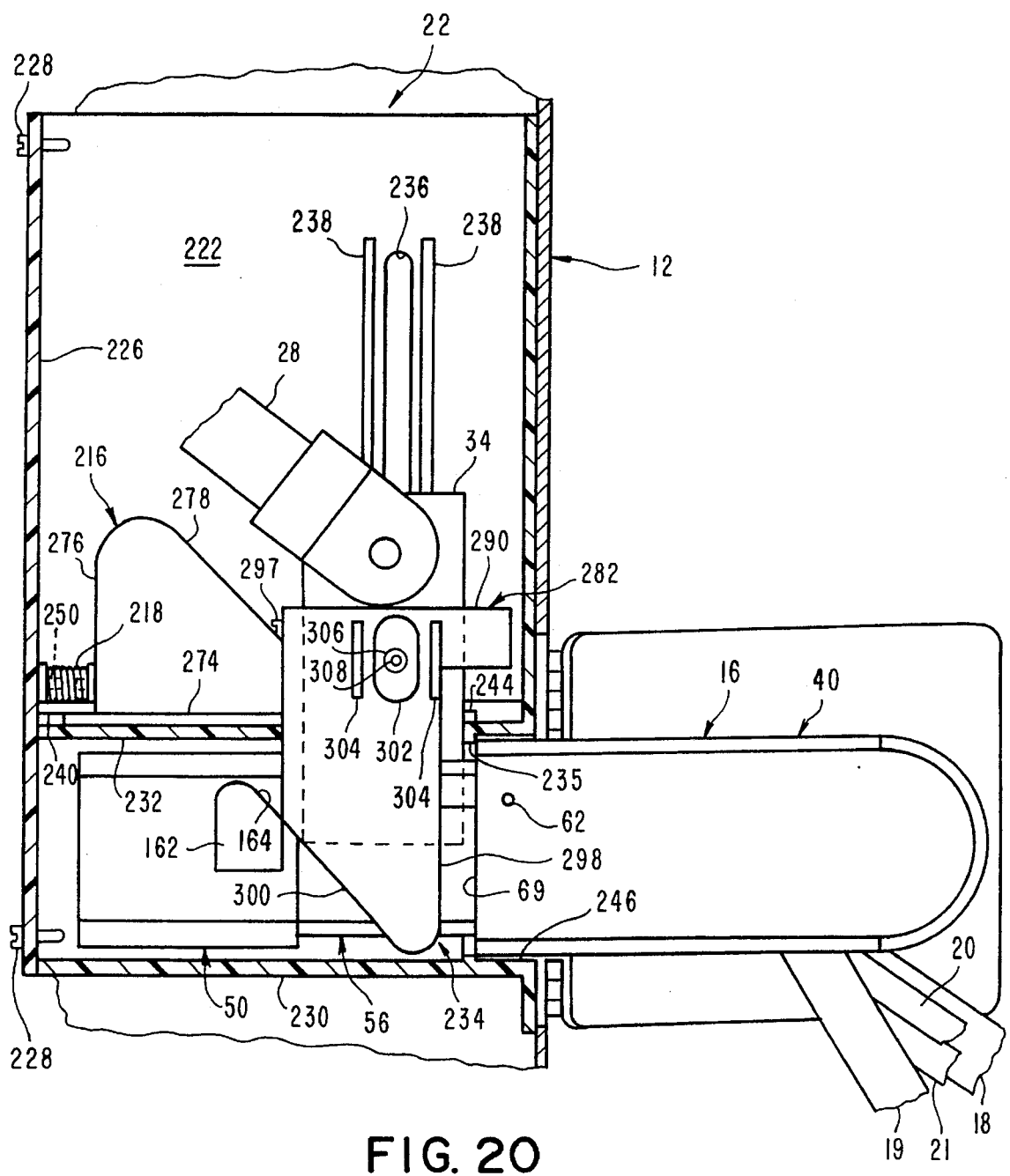
FIG. 20 is a cross-sectional view of the AC/DC electrical connector with the DC electrical connector fully inserted therein and electrically coupled thereto.

As particularly seen in FIGS. 18–20, cam surfaces 300 of contact drive bail 282 engage cam surfaces 278 of contact cover 216 such that downward linear movement of contact drive bail 282 causes contact cover 216 to move rearwardly against the force of compression springs 218 until the forward edge of contact cover 216 engages the rearward edges of cam plates 294. Further downward movement of contact drive bail 282 causes cam surfaces 300 of cam plates 298 to engage cam surfaces 164 or 164' of cam members 162 or 162' to move contact cover 50 or 50' of either electrical connector 16 or 16' axially in the same direction as contact cover 216. This rearward movement of contact covers 216 and 50 or 50' allows for electrical connection between AC/DC electrical connectors 22 and electrical connector 16 or 16'. Accordingly, this arrangement ensures that the electrical contacts of the electrical connector 16 or 16' and AC/DC electrical connector 22 will not be exposed until after full insertion of electrical connector 16 or 16' into the inlet cavity 234 of AC/DC electrical connector 22.

As seen in FIGS. 16 and 20, contact carrier 290 has a slide member 302 and a pair of parallel rails 304 extending outwardly from each of its opposite longitudinal ends for engaging vertical rails 238 on the interior surfaces of side walls 220 and 222 of inlet housing 212. In other words, each pair of rails 304 of contact carrier 290 straddle one of the slide members 302 to form a pair of parallel slots on each end of contact carrier 290 for slidably receiving rails 238 of inlet housing 212. Each of the slide members 302 has an outwardly extending pin 306 with a threaded hole 308 for threadedly receiving a screw 310. Pins 306 are designed to slidably secure contact drive bail 282 to side walls 220 and 222 of inlet housing 212 via vertical control slots 236 of side walls 220 and 222. In other words, pins 306 of contact drive bail 282 are slidably received within vertical slots 236 of side walls 220 and 222, and slide member 302 and rails 304 of contact drive bail 282 cooperate with rails 238 of inlet housing 212 to control the vertical movement of contact drive bail 282 relative to inlet housing 212. Preferably, contact drive bail 282 is molded as an integral one-piece, unitary member from a hard, rigid, non-conductive material such as plastic.

Referring to FIGS. 12 and 13, motors 284 are conventional reversible, electric motors having an output shaft 311 with a bevel gear 312 fixedly coupled thereto for driving screw jacks 286. Each of the screw jacks 286 includes a bevel gear 314 fixedly coupled at one end, a nut 316 fixedly coupled to each end of contact drive bail 282 via pin 306 and screws 310, and a screw shaft 318 threadedly coupled to one of the nuts 316. Each of the nuts 316 has a thread bore 330 for threadedly receiving one of the screw shafts 318 and a transverse bore 332 sized for receiving one of the pins 306 of contact drive bail 282. Nuts 316 are fastened to pins 306 of contact drive bail 22 by screws 310. Screw shafts 318 are rotatably coupled to inlet housing 212 by support blocks 239. Accordingly, motors 284 rotate output shafts 311 and first bevel gears 312 which are fixedly coupled thereto. Since bevel gears 312 mesh with bevel gears 314, rotation of bevel gears 312 causes bevel gears 314 to also rotate and to axially rotate screw shafts 318 to vertically translate nuts 316 along screw shafts 318. This axial movement of nuts 316 in turn causes vertical linear movement of contact drive bail 282 along with contact 34–39.

Sensors 288 can be fixedly mounted to inlet housing 212 adjacent inlet opening 234. Preferably, a recess 245 is formed in each of the side walls 220 and 222 for receiving sensors 288 therein. Sensors 288 are electrically coupled to microprocessor 26 to provide various information to microprocessor 26 such as the type of charging current or compatibility of electrical 16 or 16'. Preferably, sensors 288 are reed switches coupled to side walls 220 and 222 of inlet housing 212. Sensors 288 are activated, i.e., opened and closed, by one or more magnets 62 or 62' coupled to electrical connector 16 or 16'. Specifically, when DC electrical connector 16 is inserted into inlet cavity 234 of AC/DC electrical connector 22, the two magnets 62 of DC electrical connector 16 will be positioned adjacent reed switches or sensors 288 for signalling microprocessor 26 and activating motors 284. When AC electrical connector 16 is inserted into inlet cavity 234 of AC/DC electrical connector 22, the single magnet 62' of AC electrical connector 16' will be positioned adjacent one of the reed switches or sensors 288 for signalling microprocessor 26 and activating motors 284.

Accordingly, microprocessor 26 and motors 284 will not be activated, unless electrical connector 16 or 16' is correctly and fully positioned within inlet cavity 234 of inlet housing 212. If the electrical connectors 16 and 16' are both absent from inlet cavity 234 or not correctly positioned within inlet cavity 234, then reed switches or sensors 288 will sense the absence or incorrect positioning of electrical connectors 16 and 16' to prevent contacts 34–39 from being extended into inlet cavity 234.

Moreover, by selecting the number and position of magnets being coupled to either DC electrical connector 16 or AC electrical connector 16', it is possible to indicate the type of current as well as the level of the current. For example, by using two magnets 62 with one on each side of DC electrical connector 16, then both sensors 288 will be activated (closed) to indicate that a fast, high level DC charge is being supplied to vehicle 12 by electrical connector 16. If only one magnet 62' is coupled to the right side of electrical connector 16', then only the right side sensor 288 will be activated (closed) to indicate that a slow, low level DC charge being supplied to vehicle 12. A low level DC charge can also be indicated to the microprocessor 26 by using only one magnet 62 on the left side of electrical connector 16 so that only the left side sensor 288 will be activated by DC electrical connector 16.

In this manner, microprocessor 26 can activate motors 284 to extend contacts 34–39 of DC electrical connector 22 into electrical contact with the electrical contacts of either DC electrical connector 16 or AC electrical connector 16' as well as adjust the circuitry of vehicle 12 to accommodate the amperage rating or magnitude of power to be received from electrical connector 16 or 16'.

Alternatively, microprocessor 26 can receive signals via the pilot contacts or sensors after electrical contact is made between AC/DC electrical connector 22 and either DC electrical connector 16 or AC electrical connector 16'. Stated differently, magnets 62 and 62' and sensors 288 can be used solely to activate motors 284 upon complete insertion of either DC electrical connector 16 or AC electrical connector 16' into inlet cavity 234 of AC/DC electrical connector 22, while pilot contacts 46, 46' and 37 can be used to communicate or sense the type of electrical current being supplied as well as the amperage rating of the electrical current being supplied to vehicle 12. Accordingly, the two preferred methods of discriminating between alternating electrical current and direct electrical current include (1) using sensors 288 of AC/DC electrical connector 22 in conjunction with magnets 62 or 62' on electrical connector 16 or 16', and (2) using pilot contact 37 of AC/DC electrical connector 22 in conjunction with pilot contacts 46 or 46' of electrical connector 16 or 16'.

Operation of Electrical Connector Assembly 10

Referring now to FIGS. 18–20, DC electrical connector 16 has its electrical contacts 42–48 completely sealed by contact cover 50 prior to insertion of DC electrical connector 16 into inlet cavity 234 of AC/DC electrical connector 22, while AC/DC electrical connector 22 has its electrical contacts 34–39 completely sealed by contact cover 216 prior to insertion of DC electrical connector 16 or AC electrical connector 16' into inlet cavity 234 of AC/DC electrical connector 22. Thus, inadvertent contact with either the electrical contacts 42–48 of electrical connector 16 or electrical contacts 34–39 of electrical connector 22 by the user is prevented. Similarly, electric connector 16' has its electrical contacts covered by contact cover 50' prior to insertion into electrical connector 22.

In operation, either electrical connector 16 or 16' is axially inserted into inlet cavity 234 of AC/DC electrical connector 22 until abutment surface 69 or 69' of electrical connector 16 or 16' engages inlet housing 212. In particular, inlet cavity 234 is sized to receive either electrical connector 16 or 16' therein with little or no hand force by the user during insertion of electrical connector 16 or 16' into inlet cavity 234 of electrical connector 22, since no electrical connection is performed until after complete insertion of electrical connector 16 or 16' into inlet cavity 234.

Once electrical connector 16 or 16' is fully inserted into inlet cavity 234 of AC/DC electrical connector 22, the magnet or magnets 62' or 62 will activate sensor or sensors 288. The sensor or sensors 288 will then send a signal to microprocessor 26 to indicate the type of current as well as the magnitude or level of the charging current being supplied, i.e., high level direct electrical current or low level alternating electrical current, by electrical connector 16 or 16'. The microprocessor 26 can then adjust its circuitry to accept or reject the power or energy from the power source 14 prior to electrical connection. In other words, the microprocessor 26 can prevent the power source 14 from sending electrical power to recharge the battery 24 if the current from either DC electrical connector 16 or AC electrical connector 16' is incompatible with the vehicle's circuitry. In the preferred embodiment, the vehicle's circuitry is designed to adjust its input to accommodate either direct current or alternating current at whatever level the current is being supplied. For example, direct current can be supplied to the battery or batteries 24 by a regulator, while alternating current can be converted by the vehicle to direct current and then supplied to the battery or batteries.

Now, the microprocessor 26 charges the motors 284 which in turn drives the screw jacks 286 so as to move the contact drive bail 282 downwardly along with the contacts 34–39 of AC/DC electrical connector 22. The contact drive bail 282 will first engage the contact cover 216 of AC/DC electrical connector 22 via cam plates 298 and 276. In particular, the cam surfaces 300 of cam plates 298 will contact the cam surfaces 278 of cam plates 276 causing the contact cover 216 to move rearwardly as the contact drive bail 282 moves downwardly. As contact cover 216 moves rearwardly, the opening 252 of intermediate wall 232 will be uncovered to expose contacts 34–39 to inlet cavity 234.

Upon complete retraction of contact cover 216, the forward edges of contact cover 216 will engage the rearward vertical edges of cam plates 298 of contact drive bail 282 to hold contact cover 216 in a retracted position against the force of compression springs 218. Further downward movement of contact drive bail 282 will cause cam plates 298 to engage cam surfaces 164 of cam members 162 to move the contact cover 50 or 50' of electrical connector 16 or 16' axially and inwardly within inlet cavity 234. After complete rearward movement of contact cover 50 by contact drive bail 282, the contact drive bail 282 continues downwardly causing the contacts 34–39 of AC/DC electrical connector 22 to engage the electrical contacts of electrical connector 16 or 16'.

After complete charging, a signal will be sent from microprocessor 26 to the power source 14 via pilot contact 37 and pilot contact 46 or 46' to stop the flow of electrical current. Then, microprocessor 26 will activate motors 284 to retract contact drive bail 282 and contacts 34–39. This retraction of contact drive bail 282 allows contact cover 50 or 50' and contact cover 216 to move back to the original positions due to springs 52 or 52' and springs 218. Thus, this operation is reversed to disconnect AC/DC electrical connector 22 from either DC electrical connector 16 or AC electrical connector 16'.

Electrical Connector Assembly 10a

Referring to FIGS. 21 and 22, an electrical connector assembly 10a especially designed for use with an electric car or electric vehicle 12a and a recharging station or power source 14a is illustrated in accordance with a second embodiment of the present invention. The electrical connector assembly 10a includes a first electrical connector 16a coupled to recharging station or power source 14a for dispensing either direct electrical current or alternating electrical current, and a second, universal AC/DC electrical connector 22a mounted in electric vehicle 12a and coupled to a battery 24a located in the vehicle 12a for receiving electrical energy from electrical connector 16a to recharge battery 24a. Accordingly, the electrical connector assembly 10a permits electric vehicle 12a to be recharged either with direct electrical current or alternating electrical current via microprocessor 26a.

Electrical connector assembly 10a is substantially identical to electrical connector assembly 10, discussed above, except that the universal AC/DC electrical connector 22a is in the form of a plug coupled to the electric vehicle 12a, and the electrical connector 16a is in the form of a receptacle coupled to recharging station 14a which is either set up for dispensing direct electrical current or alternating electrical current. Since electrical connector assembly 10a is substantially similar to electrical connector assembly 10, discussed above, electrical connector 10a will not be discussed or illustrated in detail herein.

As seen in FIG. 20, electrical connector 16a is mounted in power source 14a. Electrical connector 16a is in the form of a receptacle which is substantially identical to the universal AC/DC electrical connector 22, except that either the AC electrical contacts or the DC electrical contacts have been removed. In other words, the electrical connector 16a works in the same manner as electrical connector 22, except that it is designed to supply either direct electrical current or alternating electrical current. Since electrical connector 16a is similar to electrical connector 22, discussed above, electrical 16a will not be discussed in detail herein.

As seen in FIGS. 21 and 22, electrical connector 22a is in the form of a plug, and includes an insulated housing 40a, four power contacts 41a–44a for alternately receiving either direct electrical current or alternating electrical current, a pilot contact or sensor 46a, a ground contact 48a, a movable contact cover 50a with a pair of cam members 162a, and a pair of tension springs 52a for slidably coupling contact cover 50a to insulated housing 40a and for biasing contact cover 50a to a first or closed position covering the contacts 41a–44a.

Insulated housing 40a includes a handle portion 54a and a contact retainer body 56a releasably coupled to handle portion 54a by screws 58a. Contact retainer body 56a has an upper portion 70a and a lower portion 72a coupled together by screws 74. Contact retainer body 56a houses both DC contacts 41a and 44a as well as AC contacts 42a and 43a.

It will be apparent to those skilled in the art, that electrical connector 22a is substantially identical to electrical connectors 16 and 16', discussed above, except that electrical connector 22a has both DC electrical contacts 41a and 44a as well as AC electrical contacts 42a and 43a. Accordingly, electrical connector 22a will not be discussed or illustrated in detail herein.

While only two embodiments have been chosen to illustrate the invention, it will be understood by those skilled in the art from this disclosure that various changes and modifications can be made herein without departing from the scope of the invention as defined in the appended claims.

What is claimed is:

1. A universal AC/DC electrical connector for selectively receiving direct electrical current and alternating electrical current, comprising:

an insulated housing;

two direct current contacts coupled to said housing for receiving direct electrical current from a mating DC electrical connector electrically coupled to a source of direct electrical current;

two alternating current contacts coupled to said housing for receiving alternating electrical current from a mating AC electrical connector electrically coupled to a source of alternating electrical current; and sensor means, coupled to said housing, for discriminating between direct electrical current and alternating electrical current.

2. An electrical connector according to claim 1, further comprising a ground contact coupled to said housing for coupling with a mating ground contact of at least one of the mating electrical connectors.

3. An electrical connector according to claim 2, wherein said alternating current contacts are positioned between said direct current contacts.

4. An electrical connector according to claim 3, wherein said ground contact is positioned between said direct current contacts.

5. An electrical connector according to claim 2, wherein said direct current contacts are blade contacts arranged substantially parallel to each other.

6. An electrical connector according to claim 5, wherein said alternating current contacts are blade contacts which are positioned substantially parallel to said direct current contacts.

7. An electrical connector according to claim 6, wherein said direct current contacts are larger than said alternating current contacts.

8. An electrical connector according to claim 7, wherein said alternating current contacts are transversely aligned in a row with said direct current contacts.

9. An electrical connector according to claim 8, wherein said alternating current contacts are positioned between said direct current contacts.

10. An electrical connector according to claim 9, wherein said ground contact is a blade contact which is positioned substantially parallel to said direct current contacts.

11. An electrical connector according to claim 10, wherein said ground contact is positioned between said direct current contacts and transversely aligned in a row with said alternating current contacts.

12. An electrical connector according to claim 11, wherein said sensor means includes at least one communications contact for transmitting informational data.

13. An electrical connector according to claim 12, wherein said sensor means includes at least one reed switch.

14. An electrical connector according to claim 2, wherein said housing includes a movable cover movably coupled to said housing between a first position covering said direct current contacts and said alternating current contacts and a second position exposing said direct current contacts and said alternating current contacts.

15. An electrical connector according to claim 14, wherein said movable cover is normally biased by a spring to said first position.

16. An electrical connector according to claim 14, wherein said direct current contacts and said alternating current contacts are movably coupled to said housing by a drive mechanism between a retracted position and an extended position.

17. An electrical connector according to claim 16, wherein said housing includes an inlet cavity with a first opening for selectively receiving the mating electrical connectors therein by insertion in a first direction, and a second opening selectively covered by said cover for selectively receiving said direct current contacts and said alternating current contacts therethrough.

18. An electrical connector according to claim 17, wherein
said first opening lies in a first plane and said second opening lies in a second plane substantially perpendicular to said first plane so that said drive mechanism moves said direct current contacts and said alternating current contacts in a second direction substantially perpendicular to said first direction of insertion of the mating electrical connectors.

19. An electrical connector according to claim 18, wherein
said direct current contacts and said alternating current contacts are positioned in said housing above said inlet cavity.

20. An electrical connector for simultaneously mating with a pair of AC electrical contacts and a pair of DC electrical contacts of a universal AC/DC electrical connector, comprising:
an electrical cord adapted to be coupled to a source of power;
an insulated housing with at least four contact openings therein for simultaneously receiving both of the pairs of AC and DC electrical contacts of the universal AC/DC electrical connector therein;
a pair of first electrical contacts coupled within said insulated housing to said electrical cord for transmitting electrical current to the universal AC/DC electrical connector, each of said first electrical contacts being aligned with one of said contact openings in said housing such that an electrical connection is made between said first electrical contacts and one of the pairs of contacts of the universal AC/DC electrical connector to supply power thereto;
a pair of recesses formed inside of said housing and being aligned with two of said contact openings for receiving one of the pairs of the electrical contacts of the universal AC/DC electrical connector such that no electrical connection is made within said recesses with said electrical cord for supplying power to the universal AC/DC electrical connector;
sensor means, coupled to said housing, for indicating type of current being supplied; and
a contact cover movably coupled to said housing for selectively covering said contact openings in a first position and exposing said contact openings in a second position.

21. An electrical connector according to claim 20, further comprising
a ground contact coupled to said housing for coupling with a mating ground contact of the universal AC/DC electrical connector.

22. An electrical connector according to claim 20, further comprising
a sensor coupled to said housing for transmitting informational data.

23. An electrical connector according to claim 22 further comprising
a ground contact coupled to said housing and a fifth contact opening formed in said housing for coupling with a mating ground contract of the universal AC/DC electrical connector.

24. An electrical connector according to claim 23, wherein
said sensor includes at least one communications contact for transmitting said informational data and said housing further includes a sixth contact opening for receiving a mating sensor contact of the universal AC/DC electrical connector.

25. An electrical connector according to claim 23, further comprising
a movable contact cover movably coupled to said housing between a first position covering said first contacts and a second position exposing said first contacts.

26. An electrical connector according to claim 25, wherein
said movable cover is normally biased by a spring to said first position.

27. An electrical connector according to claim 25, wherein
said housing further includes a substantially flat abutment surface with a gasket coupled thereto for engaging said movable contact cover when in said first position to seal between said housing and said contact cover.

28. An electrical connector according to claim 27, wherein
said contact cover is a substantially cup-shaped member with an open end defined by a flat annular abutment edge for engaging said gasket.

29. An electrical connector according to claim 28, wherein
said contact openings of said housing lie in a first plane and said abutment surface of said housing lies in a second plane substantially perpendicular to said first plane.

30. An electrical connector according to claim 25, wherein
said contact cover includes a cam member for moving said contact cover to expose said direct current contacts and said alternating current contacts.

* * * * *